United States Patent
Ichikawa et al.

(10) Patent No.: US 8,644,647 B2
(45) Date of Patent: Feb. 4, 2014

(54) OPTICAL CONTROL DEVICE

(75) Inventors: Junichiro Ichikawa, Chiyoda-ku (JP);
Futoshi Yamamoto, Chiyoda-ku (JP);
Yuhki Kinpara, Chiyoda-ku (JP);
Katsutoshi Kondou, Chiyoda-ku (JP);
Satoshi Oikawa, Chiyoda-ku (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 13 days.

(21) Appl. No.: 12/225,787

(22) PCT Filed: Mar. 30, 2007

(86) PCT No.: PCT/JP2007/057196
§ 371 (c)(1),
(2), (4) Date: Dec. 15, 2008

(87) PCT Pub. No.: WO2007/114367
PCT Pub. Date: Oct. 11, 2007

(65) Prior Publication Data
US 2010/0232736 A1 Sep. 16, 2010

(30) Foreign Application Priority Data
Mar. 31, 2006 (JP) .................................. 2006-100533

(51) Int. Cl.
*G02F 1/035* (2006.01)
(52) U.S. Cl.
USPC .......................................................... 385/2
(58) Field of Classification Search
USPC .......................................................... 385/2
See application file for complete search history.

(56) References Cited

U.S. PATENT DOCUMENTS

| | | | |
|---|---|---|---|
| 3,760,216 A * | 9/1973 | Lasser et al. | 313/103 CM |
| 4,743,870 A * | 5/1988 | Jen et al. | 333/147 |
| 5,388,170 A | 2/1995 | Heismann et al. | |
| 5,991,491 A | 11/1999 | Madabhushi | |
| 6,580,843 B2 | 6/2003 | Doi et al. | |
| 7,035,485 B2 | 4/2006 | Kondo et al. | |

(Continued)

FOREIGN PATENT DOCUMENTS

| | | |
|---|---|---|
| JP | 64-018121 A | 1/1989 |
| JP | 3-229214 A | 10/1991 |

(Continued)

*Primary Examiner* — Ryan Lepisto
*Assistant Examiner* — Jerry Blevins
(74) *Attorney, Agent, or Firm* — Chapman and Cutler LLP

(57) ABSTRACT

It is an object to provide an optical control device capable of realizing speed matching between a microwave and a light wave or impedance matching of microwaves and of reducing a driving voltage. An optical control device including a thin plate 1 (11) which has an electro-optical effect and has a thickness of 10 μm or less, an optical waveguide 2 formed in the thin plate, and control electrodes for controlling light passing through the optical waveguide is characterized in that the control electrodes are configured to include a first electrode and a second electrode disposed to interpose the thin plate therebetween, the first electrode has a coplanar type electrode including at least a signal electrode 4 and a ground electrode 5, and the second electrode has at least a ground electrode 54 (55, 56) and is configured to apply an electric field to the optical waveguide in cooperation with the signal electrode of the first electrode.

11 Claims, 29 Drawing Sheets

(56) References Cited

U.S. PATENT DOCUMENTS

| | | |
|---|---|---|
| 2002/0154843 A1 | 10/2002 | Betts |
| 2002/0191886 A1* | 12/2002 | Castoldi et al. ............. 385/14 |
| 2003/0002766 A1* | 1/2003 | Pruneri et al. ............... 385/2 |
| 2003/0044100 A1* | 3/2003 | Kondo et al. ................. 385/3 |
| 2004/0037516 A1* | 2/2004 | Torigoe et al. ............... 385/92 |
| 2006/0120654 A1* | 6/2006 | Aoki et al. ................... 385/2 |
| 2007/0237442 A1* | 10/2007 | Marks et al. ................. 385/2 |
| 2008/0107372 A1* | 5/2008 | Fujimori et al. ............. 385/2 |

FOREIGN PATENT DOCUMENTS

| | | |
|---|---|---|
| JP | 6-130338 A | 5/1994 |
| JP | 7-199134 A | 8/1995 |
| JP | 10-039266 A | 2/1998 |
| JP | 2002-182173 A | 6/2002 |
| JP | 2003-075790 A | 3/2003 |
| JP | 2003-156723 A | 5/2003 |
| JP | 2003-215519 A | 7/2003 |
| JP | 3638300 B2 | 1/2005 |
| JP | 2005-274793 A | 10/2005 |

* cited by examiner

FIG. 4
(a) 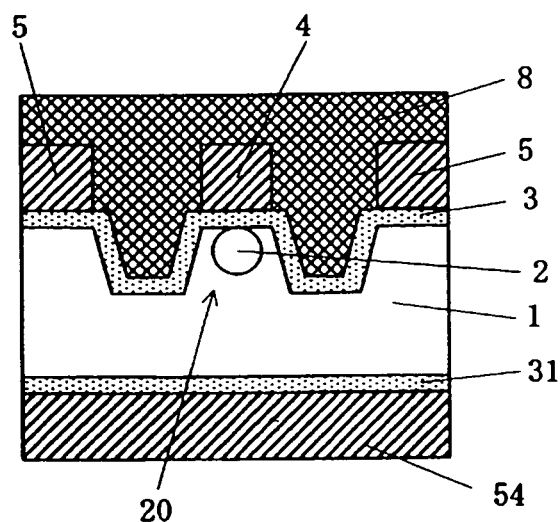
(b) 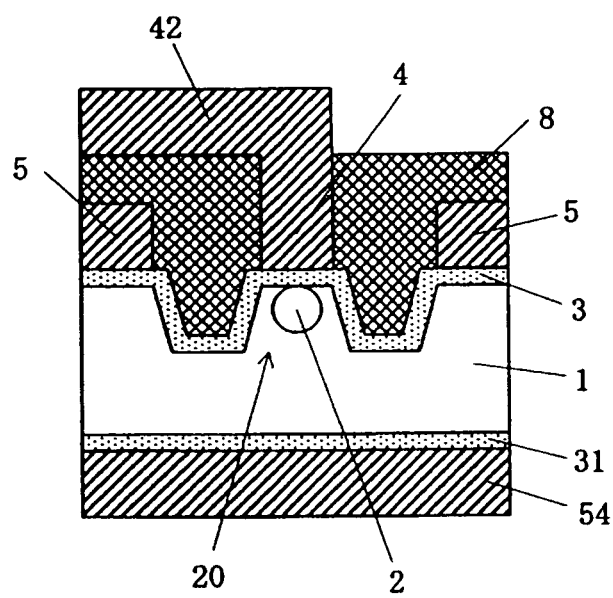

FIG. 5
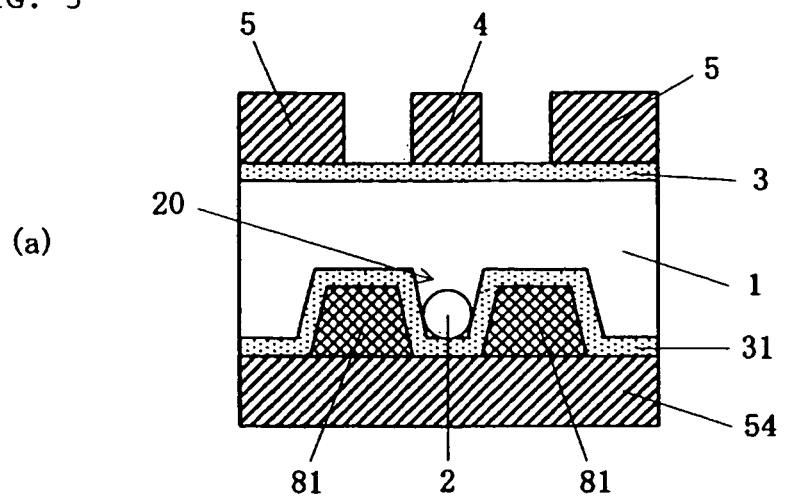
(a)
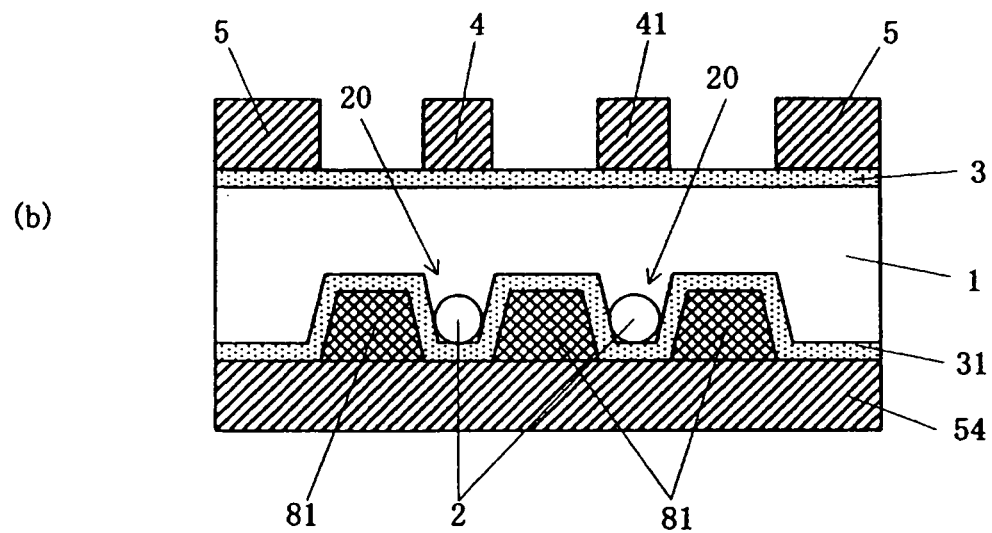
(b)

FIG. 6
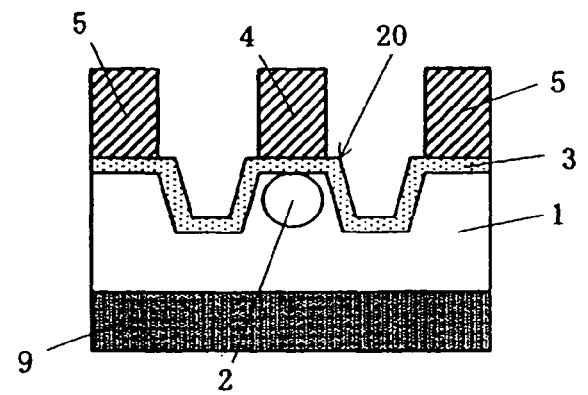
(a)
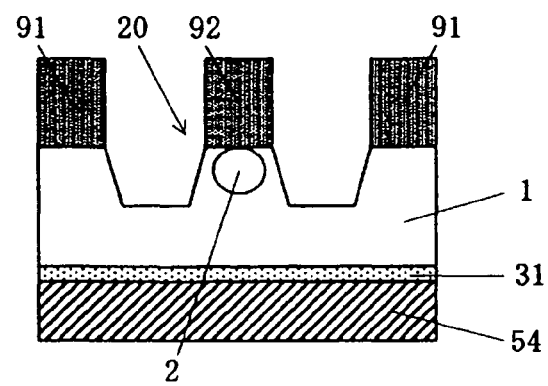
(b)
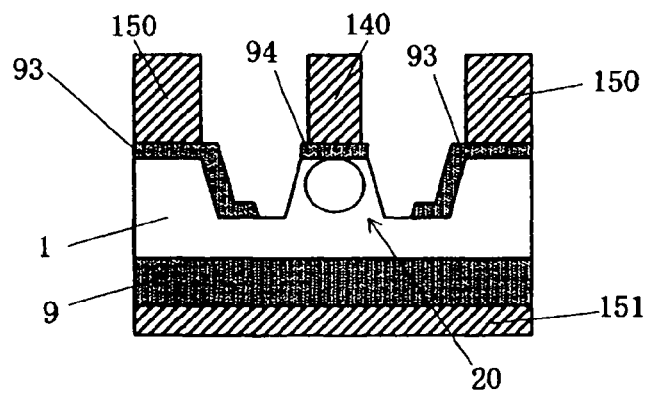
(c)
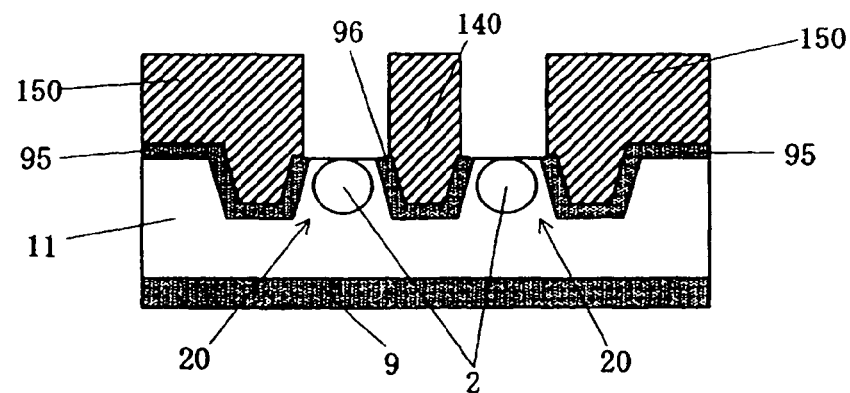
(d)

FIG. 7
(a) 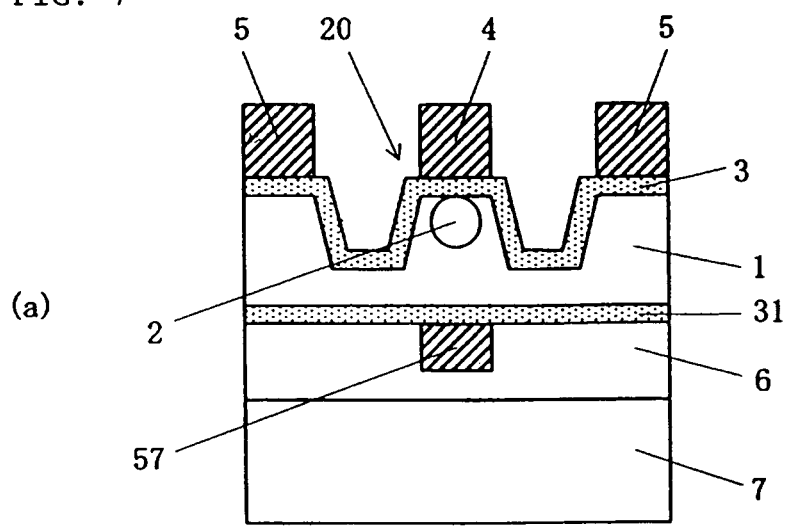
(b) 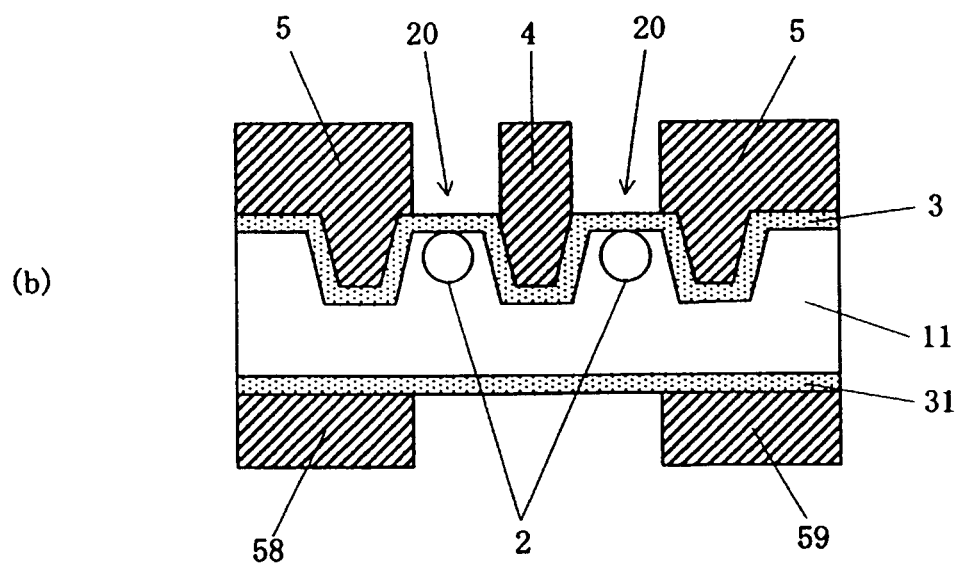

FIG. 8
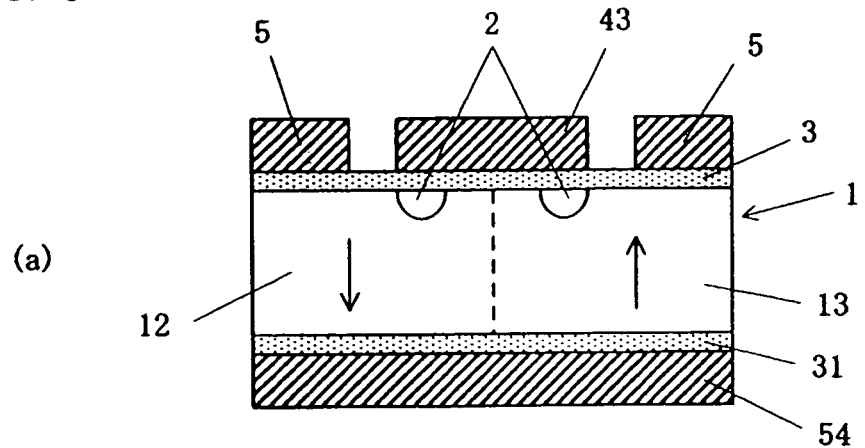
(a)
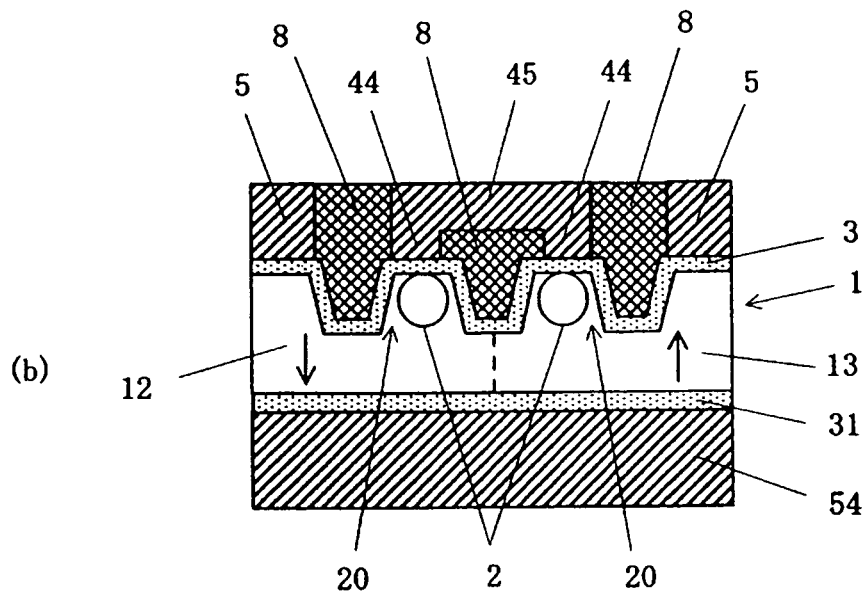
(b)

FIG. 12

| W/t | | Gap/t | D/t = 0.2 | | | | | | | | | | | | | | | | | |
|---|---|---|---|---|---|---|---|---|---|---|---|---|---|---|---|---|---|---|---|---|
| | | | $T_{EL}$ | | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| 0.2 | | 1 | × | × | × | × | × | × | × | × | × | × | × | × | × | × | × | ○ | × | × |
| | | 2.3 | × | × | × | × | × | × | × | × | × | × | × | × | × | × | × | × | × | × |
| | | 3.5 | × | × | × | × | × | × | × | × | × | × | × | × | × | × | × | × | × | × |
| | | 4.8 | × | × | × | × | × | × | × | × | × | × | × | × | × | × | × | × | × | × |
| | | 6 | × | × | × | × | × | × | × | × | × | × | × | × | × | × | × | × | × | × |
| 0.5 | | 1 | × | ○ | × | × | × | × | ○ | × | × | ○ | × | × | ○ | × | × | ○ | × | × |
| | | 2.3 | × | ○ | × | × | ○ | × | × | ○ | × | × | × | × | × | × | × | × | × | × |
| | | 3.5 | × | ○ | × | × | ○ | × | × | ○ | × | × | ○ | × | × | ○ | × | × | × | × |
| | | 4.8 | × | ○ | × | × | ○ | × | × | ○ | × | × | ○ | × | × | ○ | × | × | ○ | × |
| | | 6 | × | ○ | × | × | ○ | × | × | ○ | × | × | ○ | × | × | ○ | × | × | ○ | × |
| 0.8 | | 1 | ○ | ○ | × | ○ | ○ | × | ○ | × | ○ | ○ | × | × | ○ | × | × | ○ | × | × |
| | | 2.3 | × | ○ | × | × | ○ | × | ○ | ○ | × | ○ | ○ | ○ | ◉ | ◉ | ◉ | ◉ | ◉ | ◉ |
| | | 3.5 | × | ○ | × | × | ○ | × | × | ○ | × | ○ | ○ | × | ◉ | ◉ | ◉ | ◉ | ◉ | ◉ |
| | | 4.8 | × | ○ | × | × | ○ | × | × | ○ | × | ○ | ○ | × | ◉ | ◉ | ◉ | ◉ | ◉ | ◉ |
| | | 6 | × | ○ | × | × | ○ | × | × | ○ | × | × | ○ | × | ◉ | ◉ | ◉ | ◉ | ◉ | ◉ |
| 1.1 | | 1 | ◉ | ◉ | ◉ | ◉ | ◉ | ◉ | ◉ | ◉ | ◉ | ◉ | ◉ | ◉ | ○ | × | ○ | ○ | × | ○ |
| | | 2.3 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| | | 3.5 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| | | 4.8 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| | | 6 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| 1.4 | | 1 | ◉ | ◉ | ◉ | ◉ | ◉ | ◉ | ◉ | ◉ | ◉ | ◉ | ◉ | ◉ | ◉ | ◉ | ◉ | ○ | × | ○ |
| | | 2.3 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| | | 3.5 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| | | 4.8 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| | | 6 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| 1.7 | | 1 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| | | 2.3 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| | | 3.5 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| | | 4.8 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| | | 6 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| 2 | | 1 | ◉ | ◉ | ◉ | ◉ | ◉ | ◉ | ◉ | ◉ | ◉ | ◉ | ◉ | ◉ | ◉ | ◉ | ◉ | × | ○ | ○ |
| | | 2.3 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| | | 3.5 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| | | 4.8 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |
| | | 6 | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ |

| | | | D/t | | | | | | | | | | | | | | | | |
|---|---|---|---|---|---|---|---|---|---|---|---|---|---|---|---|---|---|---|---|
| | | | 0.6 | | | | | | | | | | | | | | | | |
| W/t | | | $T_{EL}$ | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| | 0.2 | Gap/t 1 | × | × | × | × | × | × | × | × | × | × | × | × | × | × | × | ○ | × | × |
| | | 2.3 | × | × | × | × | × | × | × | × | × | × | × | × | × | × | × | × | × | × |
| | | 3.5 | × | × | × | × | × | × | × | × | × | × | × | × | × | × | × | × | × | × |
| | | 4.8 | × | × | × | × | × | × | × | × | × | × | × | × | × | × | × | × | × | × |
| | | 6 | × | × | × | × | × | × | × | × | × | × | × | × | × | × | × | × | × | × |
| | 0.5 | 1 | × | × | ○ | × | × | ○ | × | × | ○ | ○ | × | ○ | ○ | × | ○ | ○ | × | ○ |
| | | 2.3 | × | ○ | ○ | × | × | ○ | × | × | ○ | × | × | ○ | × | × | ○ | × | × | ○ |
| | | 3.5 | × | ○ | ○ | × | ○ | ○ | × | × | ○ | × | × | ○ | × | × | ○ | × | × | ○ |
| | | 4.8 | × | ○ | ○ | × | ○ | ○ | × | × | ○ | × | × | ○ | × | × | ○ | × | × | ○ |
| | | 6 | × | ○ | ○ | × | ○ | ○ | × | ○ | ○ | × | × | ○ | × | × | ○ | × | × | ○ |
| | 0.8 | 1 | × | ○ | ○ | ○ | × | ○ | ○ | × | ○ | ○ | × | ○ | ○ | × | ○ | ○ | × | ○ |
| | | 2.3 | × | ○ | ○ | × | ○ | ○ | × | ○ | ○ | ⊚ | ⊚ | ⊚ | ○ | × | ○ | ○ | × | ○ |
| | | 3.5 | × | ○ | ○ | × | ○ | ○ | × | ○ | ○ | × | ○ | ○ | × | ○ | ○ | ⊚ | ⊚ | ⊚ |
| | | 4.8 | × | ○ | ○ | × | ○ | ○ | × | ○ | ○ | × | ○ | ○ | × | ○ | ○ | ⊚ | ⊚ | ⊚ |
| | | 6 | × | ○ | ○ | × | ○ | ○ | × | ○ | ○ | × | ○ | ○ | × | ○ | ○ | × | ○ | ○ |
| | 1.1 | 1 | ⊚ | ⊚ | ⊚ | ⊚ | ⊚ | ⊚ | ⊚ | ⊚ | ⊚ | ○ | × | ○ | ○ | × | ○ | ○ | × | ○ |
| | | 2.3 | × | ○ | ○ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 3.5 | × | ○ | ○ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 4.8 | × | ○ | ○ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 6 | × | ○ | ○ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | 1.4 | 1 | ⊚ | ⊚ | ⊚ | ⊚ | ⊚ | ⊚ | ⊚ | ⊚ | ⊚ | ⊚ | ⊚ | ⊚ | ○ | × | ○ | ○ | × | ○ |
| | | 2.3 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 3.5 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 4.8 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 6 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | 1.7 | 1 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ○ | × | ○ |
| | | 2.3 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 3.5 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 4.8 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 6 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | 2 | 1 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 2.3 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 3.5 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 4.8 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 6 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |

FIG. 15

| | | | D/t | | | | | | | | | | | | | | | | |
|---|---|---|---|---|---|---|---|---|---|---|---|---|---|---|---|---|---|---|---|
| | | | 0.8 | | | | | | | | | | | | | | | | |
| W/t | | | $T_{EL}$ | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| 0.2 | Gap/t | 1 | × | × | × | × | × | × | × | × | × | × | × | ○ | × | × | ○ | × | × | ○ |
| | | 2.3 | × | × | × | × | × | × | × | × | × | × | × | × | × | × | × | × | × | × |
| | | 3.5 | × | × | × | × | × | × | × | × | × | × | × | × | × | × | × | × | × | × |
| | | 4.8 | × | × | × | × | × | × | × | × | × | × | × | × | × | × | × | × | × | × |
| | | 6 | × | × | × | × | × | × | × | × | × | × | × | × | × | × | × | × | × | × |
| 0.5 | Gap/t | 1 | × | × | ○ | × | × | ○ | × | × | ○ | ○ | × | ○ | ○ | × | ○ | ○ | × | ○ |
| | | 2.3 | × | × | ○ | × | × | ○ | × | × | ○ | × | × | ○ | × | × | ○ | × | × | ○ |
| | | 3.5 | × | ○ | ○ | × | × | ○ | × | × | ○ | × | × | ○ | × | × | ○ | × | × | ○ |
| | | 4.8 | × | ○ | ○ | × | × | ○ | × | × | ○ | × | × | ○ | × | × | ○ | × | × | ○ |
| | | 6 | × | ○ | ○ | × | × | ○ | × | × | ○ | × | × | ○ | × | × | ○ | × | × | ○ |
| 0.8 | Gap/t | 1 | × | ○ | ○ | ○ | × | ○ | ○ | × | ○ | ○ | × | ○ | ○ | × | ○ | ○ | × | ○ |
| | | 2.3 | × | ○ | ○ | × | ○ | ○ | × | ○ | ○ | × | ○ | ○ | × | ○ | ○ | × | ○ | ○ |
| | | 3.5 | × | ○ | ○ | × | ○ | ○ | × | ○ | ○ | × | ○ | ○ | × | ○ | ○ | × | ○ | ○ |
| | | 4.8 | × | ○ | ○ | × | ○ | ○ | × | ○ | ○ | × | ○ | ○ | × | ○ | ○ | × | ○ | ○ |
| | | 6 | × | ○ | ○ | × | ○ | ○ | × | ○ | ○ | × | ○ | ○ | × | ○ | ○ | × | ○ | ○ |
| 1.1 | Gap/t | 1 | ◎ | ◎ | ◎ | ◎ | ◎ | ◎ | ○ | × | ○ | ○ | × | ○ | ○ | × | ○ | ○ | × | ○ |
| | | 2.3 | × | ○ | ○ | ◎ | ◎ | ◎ | ◎ | ◎ | ◎ | ◎ | ◎ | ◎ | ◎ | ◎ | ◎ | ◎ | ◎ | ◎ |
| | | 3.5 | × | ○ | ○ | ◎ | ◎ | ◎ | ◎ | ◎ | ◎ | ◎ | ◎ | ◎ | ◎ | ◎ | ◎ | ◎ | ◎ | ◎ |
| | | 4.8 | × | ○ | ○ | × | ○ | ○ | ◎ | ◎ | ◎ | ◎ | ◎ | ◎ | ◎ | ◎ | ◎ | ◎ | ◎ | ◎ |
| | | 6 | × | ○ | ○ | × | ○ | ○ | ◎ | ◎ | ◎ | ◎ | ◎ | ◎ | ◎ | ◎ | ◎ | ◎ | ◎ | ◎ |
| 1.4 | Gap/t | 1 | ◎ | ◎ | ◎ | ◎ | ◎ | ◎ | ◎ | ◎ | ◎ | ○ | × | ○ | ○ | × | ○ | ○ | × | ○ |
| | | 2.3 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 3.5 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 4.8 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 6 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| 1.7 | Gap/t | 1 | ◎ | ◎ | ◎ | ◎ | ◎ | ◎ | ◎ | ◎ | ◎ | ◎ | ◎ | ◎ | ◎ | ◎ | ◎ | ○ | × | ○ |
| | | 2.3 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 3.5 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 4.8 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 6 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| 2 | Gap/t | 1 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 2.3 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 3.5 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 4.8 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 6 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |

FIG. 16

|  |  |  | D/t |||||||||||||||||
|---|---|---|---|---|---|---|---|---|---|---|---|---|---|---|---|---|---|---|
|  |  |  | 0.2 |||||||||||||||||
|  |  |  | $T_{EL}$ |||||||||||||||||
|  |  |  | 0.5 ||| 1 ||| 1.5 ||| 2 ||| 2.5 ||| 3 |||
|  |  |  | Z0 | NM | Vpi | Z0 | NM | Vpi | Z0 | NM | Vpi | Z0 | NM | Vpi | Z0 | NM | Vpi | Z0 | NM | Vpi |
| W/t | 0.2 | Gap/t 1 | × | ○ | × | × | × | × | × | × | × | × | × | × | × | × | × | × | × | × |
|  |  | 2.3 | × | ○ | × | × | ○ | × | × | ○ | × | × | ○ | × | × | ○ | × | × | × | × |
|  |  | 3.5 | × | ○ | × | × | ○ | × | × | ○ | × | × | ○ | × | × | ○ | × | × | ○ | × |
|  |  | 4.8 | × | ○ | × | × | ○ | × | × | ○ | × | × | ○ | × | × | ○ | × | × | ○ | × |
|  |  | 6 | × | ○ | × | × | ○ | × | × | ○ | × | × | ○ | × | × | ○ | × | × | ○ | × |
|  | 0.5 | 1 | × | ○ | × | × | ○ | × | ○ | ○ | × | ○ | ○ | × | ○ | ○ | × | ○ | ○ | × |
|  |  | 2.3 | × | ○ | × | × | ○ | × | × | ○ | × | ○ | ○ | × | ○ | ○ | × | ○ | ○ | × |
|  |  | 3.5 | × | ○ | × | × | ○ | × | × | ○ | × | × | ○ | × | × | ○ | × | × | ○ | × |
|  |  | 4.8 | × | ○ | × | × | ○ | × | × | ○ | × | × | ○ | × | × | ○ | × | × | ○ | × |
|  |  | 6 | × | ○ | × | × | ○ | × | × | ○ | × | × | ○ | × | × | ○ | × | × | ○ | × |
|  | 0.8 | 1 | ○ | ○ | × | ○ | ○ | × | ○ | ○ | × | ○ | ○ | × | ○ | ○ | × | ○ | ○ | × |
|  |  | 2.3 | ○ | ○ | × | ○ | ○ | × | ○ | ○ | × | ○ | ○ | × | ○ | ○ | × | ○ | ○ | × |
|  |  | 3.5 | ○ | ○ | × | ○ | ○ | × | ○ | ○ | × | ○ | ○ | × | ○ | ○ | × | ○ | ○ | × |
|  |  | 4.8 | ○ | ○ | × | ○ | ○ | × | ○ | ○ | × | ○ | ○ | × | ○ | ○ | × | ○ | ○ | × |
|  |  | 6 | ○ | ○ | × | ○ | ○ | × | ○ | ○ | × | ○ | ○ | × | ○ | ○ | × | ○ | ○ | × |
|  | 1.1 | 1 | ◎ | ◎ | ◎ | ○ | ○ | × | ○ | ○ | × | ○ | ○ | × | ○ | ○ | × | ○ | ○ | × |
|  |  | 2.3 | ◎ | ◎ | ◎ | ◎ | ◎ | ◎ | ◎ | ◎ | ◎ | ◎ | ◎ | ◎ | ○ | ○ | × | ○ | ○ | × |
|  |  | 3.5 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
|  |  | 4.8 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
|  |  | 6 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
|  | 1.4 | 1 | ◎ | ◎ | ◎ | ◎ | ◎ | ◎ | ○ | ○ | × | ○ | ○ | × | ○ | ○ | × | ○ | ○ | × |
|  |  | 2.3 | ○ | × | ○ | ◎ | ◎ | ◎ | ◎ | ◎ | ◎ | ◎ | ◎ | ◎ | ◎ | ◎ | ◎ | ◎ | ◎ | ◎ |
|  |  | 3.5 | ○ | × | ○ | ○ | × | ○ | ◎ | ◎ | ◎ | ◎ | ◎ | ◎ | ◎ | ◎ | ◎ | ◎ | ◎ | ◎ |
|  |  | 4.8 | ○ | × | ○ | ○ | × | ○ | ◎ | ◎ | ◎ | ◎ | ◎ | ◎ | ◎ | ◎ | ◎ | ◎ | ◎ | ◎ |
|  |  | 6 | ○ | × | ○ | ○ | × | ○ | ◎ | ◎ | ◎ | ◎ | ◎ | ◎ | ◎ | ◎ | ◎ | ◎ | ◎ | ◎ |
|  | 1.7 | 1 | ◎ | ◎ | ◎ | ◎ | ◎ | ◎ | ○ | ○ | × | ○ | ○ | × | ○ | ○ | × | × | ○ | × |
|  |  | 2.3 | ○ | × | ○ | ○ | × | ○ | ○ | × | ○ | ◎ | ◎ | ◎ | ◎ | ◎ | ◎ | ◎ | ◎ | ◎ |
|  |  | 3.5 | ○ | × | ○ | ○ | × | ○ | ○ | × | ○ | ○ | × | ○ | ◎ | ◎ | ◎ | ◎ | ◎ | ◎ |
|  |  | 4.8 | ○ | × | ○ | ○ | × | ○ | ○ | × | ○ | ○ | × | ○ | ○ | × | ○ | ◎ | ◎ | ◎ |
|  |  | 6 | ○ | × | ○ | ○ | × | ○ | ○ | × | ○ | ○ | × | ○ | ○ | × | ○ | ◎ | ◎ | ◎ |
|  | 2 | 1 | ○ | × | ○ | ○ | ○ | × | × | ○ | × | × | ○ | × | × | ○ | × | × | ○ | × |
|  |  | 2.3 | ○ | × | ○ | ○ | × | ○ | ○ | × | ○ | ○ | × | ○ | ○ | × | ○ | ○ | × | ○ |
|  |  | 3.5 | ○ | × | ○ | ○ | × | ○ | ○ | × | ○ | ○ | × | ○ | ○ | × | ○ | ○ | × | ○ |
|  |  | 4.8 | ○ | × | ○ | ○ | × | ○ | ○ | × | ○ | ○ | × | ○ | ○ | × | ○ | ○ | × | ○ |
|  |  | 6 | ○ | × | ○ | ○ | × | ○ | ○ | × | ○ | ○ | × | ○ | ○ | × | ○ | ○ | × | ○ |

FIG. 17

| | | | D/t | | | | | | | | | | | | | | | | |
|---|---|---|---|---|---|---|---|---|---|---|---|---|---|---|---|---|---|---|---|
| | | | 0.4 | | | | | | | | | | | | | | | | |
| | | | $T_{EL}$ | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| W/t | 0.2 | Gap/t 1 | × | O | × | × | × | × | × | × | × | × | × | × | × | × | × | × | × | × |
| | | 2.3 | × | O | × | × | O | × | × | × | × | × | × | × | × | × | × | × | × | × |
| | | 3.5 | × | O | × | × | O | × | × | O | × | × | × | × | × | × | × | × | × | × |
| | | 4.8 | × | O | × | × | O | × | × | O | × | × | O | × | × | × | × | × | × | × |
| | | 6 | × | O | × | × | O | × | × | O | × | × | O | × | × | × | × | × | × | × |

FIG. 18

| | | | D/t | | | | | | | | | | | | | | | | |
|---|---|---|---|---|---|---|---|---|---|---|---|---|---|---|---|---|---|---|---|
| | | | 0.6 | | | | | | | | | | | | | | | | |
| | | | $T_{EL}$ | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| W/t | 0.2 | Gap/t 1 | × | × | × | × | × | × | × | × | × | × | × | × | × | × | × | × | × | × |
| | | 2.3 | × | O | × | × | × | × | × | × | × | × | × | × | × | × | × | × | × | × |
| | | 3.5 | × | O | × | × | O | × | × | × | × | × | × | × | × | × | × | × | × | × |
| | | 4.8 | × | O | × | × | O | × | × | × | × | × | × | × | × | × | × | × | × | × |
| | | 6 | × | O | × | × | O | × | × | × | × | × | × | × | × | × | × | × | × | × |

(Table continues for W/t = 0.5, 0.8, 1.1, 1.4, 1.7, 2 with varying Gap/t and $T_{EL}$ values; shaded cells indicate preferred regions.)

FIG. 19

| | | | | D/t | | | | | | | | | | | | | | | |
|---|---|---|---|---|---|---|---|---|---|---|---|---|---|---|---|---|---|---|---|
| | | | | 0.8 | | | | | | | | | | | | | | | |
| | | | | $T_{EL}$ | | | | | | | | | | | | | | | |
| | | | | 0.5 | | | 1 | | | 1.5 | | | 2 | | | 2.5 | | | 3 | | |
| W/t | | | | Z0 | NM | Vpi | Z0 | NM | Vpi | Z0 | NM | Vpi | Z0 | NM | Vpi | Z0 | NM | Vpi | Z0 | NM | Vpi |
| 0.2 | Gap/t | 1 | × | × | × | × | × | × | × | × | × | × | × | × | × | × | × | × | × | × |
| | | 2.3 | × | ○ | × | × | × | × | × | × | × | × | × | × | × | × | × | × | × | × |
| | | 3.5 | × | ○ | × | × | × | × | × | × | × | × | × | × | × | × | × | × | × | × |
| | | 4.8 | × | ○ | × | × | × | × | × | × | × | × | × | × | × | × | × | × | × | × |
| | | 6 | × | ○ | × | × | × | × | × | × | × | × | × | × | × | × | × | × | × | × |
| 0.5 | Gap/t | 1 | × | ○ | ○ | × | ○ | ○ | × | ○ | ○ | ◎ | ◎ | ◎ | ◎ | ◎ | ◎ | ○ | × | ○ |
| | | 2.3 | × | ○ | ○ | × | ○ | ○ | × | ○ | ○ | × | ○ | ○ | × | ○ | ○ | × | ○ | ○ |
| | | 3.5 | × | ○ | ○ | × | ○ | ○ | × | ○ | ○ | × | ○ | ○ | × | ○ | ○ | × | ○ | ○ |
| | | 4.8 | × | ○ | ○ | × | ○ | ○ | × | ○ | ○ | × | ○ | ○ | × | ○ | ○ | × | ○ | ○ |
| | | 6 | × | ○ | ○ | × | ○ | ○ | × | ○ | ○ | × | ○ | ○ | × | ○ | ○ | × | ○ | ○ |
| 0.8 | Gap/t | 1 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 2.3 | × | ○ | ○ | ◎ | ◎ | ◎ | ◎ | ◎ | ◎ | ◎ | ◎ | ◎ | ◎ | ◎ | ◎ | ◎ | ◎ | ◎ |
| | | 3.5 | × | ○ | ○ | ◎ | ◎ | ◎ | ◎ | ◎ | ◎ | ◎ | ◎ | ◎ | ◎ | ◎ | ◎ | ◎ | ◎ | ◎ |
| | | 4.8 | × | ○ | ○ | ◎ | ◎ | ◎ | ◎ | ◎ | ◎ | ◎ | ◎ | ◎ | ◎ | ◎ | ◎ | ◎ | ◎ | ◎ |
| | | 6 | × | ○ | ○ | ◎ | ◎ | ◎ | ◎ | ◎ | ◎ | ◎ | ◎ | ◎ | ◎ | ◎ | ◎ | ◎ | ◎ | ◎ |
| 1.1 | Gap/t | 1 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 2.3 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 3.5 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 4.8 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 6 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| 1.4 | Gap/t | 1 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 2.3 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 3.5 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 4.8 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 6 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| 1.7 | Gap/t | 1 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 2.3 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 3.5 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 4.8 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 6 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| 2 | Gap/t | 1 | ◎ | ◎ | ◎ | ◎ | ◎ | ◎ | ◎ | ◎ | ◎ | ◎ | ◎ | ◎ | × | ○ | ○ | × | ○ | ○ |
| | | 2.3 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 3.5 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 4.8 | ○ | × | ○ | ◎ | ◎ | ◎ | ◎ | ◎ | ◎ | ◎ | ◎ | ◎ | ◎ | ◎ | ◎ | ◎ | ◎ | ◎ |
| | | 6 | ○ | × | ○ | ◎ | ◎ | ◎ | ◎ | ◎ | ◎ | ◎ | ◎ | ◎ | ◎ | ◎ | ◎ | ◎ | ◎ | ◎ |

FIG. 20

| W/t | Gap/t | | D/t = 0.2 | | | | | | | | | | | | | | | | | |
|---|---|---|---|---|---|---|---|---|---|---|---|---|---|---|---|---|---|---|---|---|
| | | | $T_{EL}$ | | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| 0.2 | 1 | | × | O | × | × | O | × | × | O | × | × | O | × | × | O | × | × | O | × |
| | 2.3 | | × | O | × | × | O | × | × | O | × | × | O | × | × | O | × | × | O | × |
| | 3.5 | | × | O | × | × | O | × | × | O | × | × | O | × | × | O | × | × | O | × |
| | 4.8 | | × | O | × | × | O | × | × | O | × | × | O | × | × | O | × | × | O | × |
| | 6 | | × | O | × | × | O | × | × | O | × | × | O | × | × | O | × | × | O | × |
| 0.5 | 1 | | × | O | × | × | O | × | O | O | × | O | O | × | O | O | × | O | O | × |
| | 2.3 | | × | O | × | × | O | × | × | O | × | O | O | × | O | O | × | O | O | × |
| | 3.5 | | × | O | × | × | O | × | × | O | × | O | O | × | O | O | × | O | O | × |
| | 4.8 | | × | O | × | × | O | × | × | O | × | O | O | × | O | O | × | O | O | × |
| | 6 | | × | O | × | × | O | × | × | O | × | O | O | × | O | O | × | O | O | × |
| 0.8 | 1 | | O | × | × | O | × | × | O | O | × | O | O | × | O | O | × | O | O | × |
| | 2.3 | | O | × | × | O | × | × | O | × | × | O | × | × | O | O | × | O | O | × |
| | 3.5 | | O | × | × | O | × | × | O | × | × | O | × | × | O | O | × | O | O | × |
| | 4.8 | | O | × | × | O | × | × | O | × | × | O | × | × | O | O | × | O | O | × |
| | 6 | | O | × | × | O | × | × | O | × | × | O | × | × | O | O | × | O | O | × |
| 1.1 | 1 | | O | × | × | O | × | × | O | × | × | O | × | × | O | × | × | O | × | × |
| | 2.3 | | O | × | × | O | × | × | O | × | × | O | × | × | O | × | × | O | × | × |
| | 3.5 | | O | × | × | O | × | × | O | × | × | O | × | × | O | × | × | O | × | × |
| | 4.8 | | O | × | × | O | × | × | O | × | × | O | × | × | O | × | × | O | × | × |
| | 6 | | O | × | × | O | × | × | O | × | × | O | × | × | O | × | × | O | × | × |
| 1.4 | 1 | | O | × | × | O | × | × | O | × | × | O | × | × | O | × | × | O | × | × |
| | 2.3 | | O | × | × | O | × | × | O | × | × | O | × | × | O | × | × | O | × | × |
| | 3.5 | | O | × | × | O | × | × | O | × | × | O | × | × | O | × | × | O | × | × |
| | 4.8 | | O | × | × | O | × | × | O | × | × | O | × | × | O | × | × | O | × | × |
| | 6 | | O | × | × | O | × | × | O | × | × | O | × | × | O | × | × | O | × | × |
| 1.7 | 1 | | O | × | × | O | × | × | O | × | × | O | × | × | O | × | × | O | × | × |
| | 2.3 | | O | × | × | O | × | × | O | × | × | O | × | × | O | × | × | O | × | × |
| | 3.5 | | O | × | × | O | × | × | O | × | × | O | × | × | O | × | × | O | × | × |
| | 4.8 | | O | × | × | O | × | × | O | × | × | O | × | × | O | × | × | O | × | × |
| | 6 | | O | × | × | O | × | × | O | × | × | O | × | × | O | × | × | O | × | × |
| 2 | 1 | | O | × | × | × | × | × | × | × | × | × | × | × | × | × | × | × | × | × |
| | 2.3 | | O | × | × | O | × | × | × | × | × | × | × | × | × | × | × | × | × | × |
| | 3.5 | | O | × | × | O | × | × | O | × | × | × | × | × | × | × | × | × | × | × |
| | 4.8 | | O | × | × | O | × | × | × | × | × | × | × | × | × | × | × | × | × | × |
| | 6 | | O | × | × | O | × | × | × | × | × | × | × | × | × | × | × | × | × | × |

FIG. 21

| W/t | | Gap/t | D/t 0.4 | | | | | | | | | | | | | | | | | |
|---|---|---|---|---|---|---|---|---|---|---|---|---|---|---|---|---|---|---|---|---|
| | | | $T_{EL}$ | | | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| | 0.2 | 1 | × | O | × | × | O | × | × | O | × | × | O | × | × | O | × | × | O | × |
| | | 2.3 | × | O | × | × | O | × | × | O | × | × | O | × | × | O | × | × | O | × |
| | | 3.5 | × | O | × | × | O | × | × | O | × | × | O | × | × | O | × | × | O | × |
| | | 4.8 | × | O | × | × | O | × | × | O | × | × | O | × | × | O | × | × | O | × |
| | | 6 | × | O | × | × | O | × | × | O | × | × | O | × | × | O | × | × | O | × |
| | 0.5 | 1 | × | O | × | × | O | × | × | O | × | × | O | × | O | O | × | O | O | × |
| | | 2.3 | × | O | × | × | O | × | × | O | × | × | O | × | × | O | × | O | O | × |
| | | 3.5 | × | O | × | × | O | × | × | O | × | × | O | × | × | O | × | O | O | × |
| | | 4.8 | × | O | × | × | O | × | × | O | × | × | O | × | × | O | × | O | O | × |
| | | 6 | × | O | × | × | O | × | × | O | × | × | O | × | × | O | × | O | O | × |
| | 0.8 | 1 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 2.3 | O | × | × | ◎ | ◎ | ◎ | ◎ | ◎ | ◎ | ◎ | ◎ | ◎ | ◎ | ◎ | ◎ | ◎ | ◎ | ◎ |
| | | 3.5 | O | × | × | ◎ | ◎ | ◎ | ◎ | ◎ | ◎ | ◎ | ◎ | ◎ | ◎ | ◎ | ◎ | ◎ | ◎ | ◎ |
| | | 4.8 | O | × | × | ◎ | ◎ | ◎ | ◎ | ◎ | ◎ | ◎ | ◎ | ◎ | ◎ | ◎ | ◎ | ◎ | ◎ | ◎ |
| | | 6 | O | × | × | ◎ | ◎ | ◎ | ◎ | ◎ | ◎ | ◎ | ◎ | ◎ | ◎ | ◎ | ◎ | ◎ | ◎ | ◎ |
| | 1.1 | 1 | O | × | O | O | × | O | O | × | O | ◎ | ◎ | ◎ | ◎ | ◎ | ◎ | O | O | × |
| | | 2.3 | O | × | O | O | × | O | O | × | O | O | × | O | O | × | O | O | O | O |
| | | 3.5 | O | × | O | O | × | O | O | × | O | O | × | O | O | × | O | O | × | O |
| | | 4.8 | O | × | O | O | × | O | O | × | O | O | × | O | O | × | O | O | × | O |
| | | 6 | O | × | O | O | × | O | O | × | O | O | × | O | O | × | O | O | × | O |
| | 1.4 | 1 | O | × | O | O | × | × | O | × | × | O | × | × | O | × | × | O | × | × |
| | | 2.3 | O | × | O | O | × | × | O | × | × | O | × | × | O | × | × | O | × | × |
| | | 3.5 | O | × | O | O | × | × | O | × | × | O | × | × | O | × | × | O | × | × |
| | | 4.8 | O | × | O | O | × | × | O | × | × | O | × | × | O | × | × | O | × | × |
| | | 6 | O | × | O | O | × | × | O | × | × | O | × | × | O | × | × | O | × | × |
| | 1.7 | 1 | O | × | × | O | × | × | O | × | × | O | × | × | O | × | × | O | × | × |
| | | 2.3 | O | × | × | O | × | × | O | × | × | O | × | × | O | × | × | O | × | × |
| | | 3.5 | O | × | × | O | × | × | O | × | × | O | × | × | O | × | × | O | × | × |
| | | 4.8 | O | × | × | O | × | × | O | × | × | O | × | × | O | × | × | O | × | × |
| | | 6 | O | × | × | O | × | × | O | × | × | O | × | × | O | × | × | O | × | × |
| | 2 | 1 | O | × | × | O | × | × | O | × | × | × | × | × | × | × | × | × | × | × |
| | | 2.3 | O | × | × | O | × | × | O | × | × | O | × | × | O | × | × | × | × | × |
| | | 3.5 | O | × | × | O | × | × | O | × | × | O | × | × | O | × | × | × | × | × |
| | | 4.8 | O | × | × | O | × | × | O | × | × | O | × | × | O | × | × | × | × | × |
| | | 6 | O | × | × | O | × | × | O | × | × | O | × | × | O | × | × | × | × | × |

FIG. 22

| | | | D/t | | | | | | | | | | | | | | | | |
|---|---|---|---|---|---|---|---|---|---|---|---|---|---|---|---|---|---|---|---|
| | | | 0.6 | | | | | | | | | | | | | | | | |
| | | | $T_{EL}$ | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| W/t | 0.2 | Gap/t 1 | × | O | × | × | O | × | × | O | × | × | O | × | × | O | × | × | O | × |
| | | 2.3 | × | O | × | × | O | × | × | O | × | × | O | × | × | O | × | × | O | × |
| | | 3.5 | × | O | × | × | O | × | × | O | × | × | O | × | × | O | × | × | O | × |
| | | 4.8 | × | O | × | × | O | × | × | O | × | × | O | × | × | O | × | × | O | × |
| | | 6 | × | O | × | × | O | × | × | O | × | × | O | × | × | O | × | × | O | × |
| | 0.5 | 1 | × | O | × | × | O | × | × | O | × | × | O | × | × | O | × | O | O | × |
| | | 2.3 | × | O | × | × | O | × | × | O | × | × | O | × | × | O | × | × | O | × |
| | | 3.5 | × | O | × | × | O | × | × | O | × | × | O | × | × | O | × | × | O | × |
| | | 4.8 | × | O | × | × | O | × | × | O | × | × | O | × | × | O | × | × | O | × |
| | | 6 | × | O | × | × | O | × | × | O | × | × | O | × | × | O | × | × | O | × |
| | 0.8 | 1 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 2.3 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 3.5 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 4.8 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 6 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | 1.1 | 1 | O | × | O | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | | 2.3 | O | × | O | O | × | O | ⊚ | ⊚ | ⊚ | ⊚ | ⊚ | ⊚ | ⊚ | ⊚ | ⊚ | ⊚ | ⊚ | ⊚ |
| | | 3.5 | O | × | O | O | × | O | O | × | O | ⊚ | ⊚ | ⊚ | ⊚ | ⊚ | ⊚ | ⊚ | ⊚ | ⊚ |
| | | 4.8 | O | × | O | O | × | O | O | × | O | ⊚ | ⊚ | ⊚ | ⊚ | ⊚ | ⊚ | ⊚ | ⊚ | ⊚ |
| | | 6 | O | × | O | O | × | O | O | × | O | ⊚ | ⊚ | ⊚ | ⊚ | ⊚ | ⊚ | ⊚ | ⊚ | ⊚ |
| | 1.4 | 1 | O | × | O | O | × | O | O | × | O | O | × | O | ⊚ | ⊚ | ⊚ | ⊚ | ⊚ | ⊚ |
| | | 2.3 | O | × | O | O | × | O | O | × | O | O | × | O | O | × | O | O | × | O |
| | | 3.5 | O | × | O | O | × | O | O | × | O | O | × | O | O | × | O | O | × | O |
| | | 4.8 | O | × | O | O | × | O | O | × | O | O | × | O | O | × | O | O | × | O |
| | | 6 | O | × | O | O | × | O | O | × | O | O | × | O | O | × | O | O | × | O |
| | 1.7 | 1 | O | × | × | O | × | × | O | × | × | O | × | × | O | × | × | O | × | × |
| | | 2.3 | O | × | × | O | × | × | O | × | × | O | × | × | O | × | × | O | × | × |
| | | 3.5 | O | × | × | O | × | × | O | × | × | O | × | × | O | × | × | O | × | × |
| | | 4.8 | O | × | × | O | × | × | O | × | × | O | × | × | O | × | × | O | × | × |
| | | 6 | O | × | × | O | × | × | O | × | × | O | × | × | O | × | × | O | × | × |
| | 2 | 1 | O | × | × | O | × | × | O | × | × | O | × | × | O | × | × | × | × | × |
| | | 2.3 | O | × | × | O | × | × | O | × | × | O | × | × | O | × | × | O | × | × |
| | | 3.5 | O | × | × | O | × | × | O | × | × | O | × | × | O | × | × | O | × | × |
| | | 4.8 | O | × | × | O | × | × | O | × | × | O | × | × | O | × | × | O | × | × |
| | | 6 | O | × | × | O | × | × | O | × | × | O | × | × | O | × | × | O | × | × |

| | | | $T_{EL}$ | | | | | | | | | | | | | | | | |
|---|---|---|---|---|---|---|---|---|---|---|---|---|---|---|---|---|---|---|
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| Gap/t | 1 | | × | O | × | × | O | × | × | O | × | × | O | × | × | O | × | × | O | × |
| | 2.3 | | × | O | × | × | O | × | × | O | × | × | O | × | × | O | × | × | O | × |
| | 3.5 | | × | O | × | × | O | × | × | O | × | × | O | × | × | O | × | × | O | × |
| | 4.8 | | × | O | × | × | O | × | × | O | × | × | O | × | × | O | × | × | O | × |
| | 6 | | × | O | × | × | O | × | × | O | × | × | O | × | × | O | × | × | O | × |

W/t = 0.5

| | | $T_{EL}$ | | | | | | | | | | | | | | | | |
|---|---|---|---|---|---|---|---|---|---|---|---|---|---|---|---|---|---|---|
| | | 0.5 | | | 1 | | | 1.5 | | | 2 | | | 2.5 | | | 3 | | |
| Gap/t | 1 | × | O | × | × | O | × | × | O | × | × | O | × | × | O | × | × | O | × |
| | 2.3 | × | O | × | × | O | × | × | O | × | × | O | × | × | O | × | × | O | × |
| | 3.5 | × | O | × | × | O | × | × | O | × | × | O | × | × | O | × | × | O | × |
| | 4.8 | × | O | × | × | O | × | × | O | × | × | O | × | × | O | × | × | O | × |
| | 6 | × | O | × | × | O | × | × | O | × | × | O | × | × | O | × | × | O | × |

W/t = 0.8 (all cells shaded, all O)

W/t = 1.1

| | | 0.5 | | | 1 | | | 1.5 | | | 2 | | | 2.5 | | | 3 | | |
|---|---|---|---|---|---|---|---|---|---|---|---|---|---|---|---|---|---|---|---|
| Gap/t | 1 | O* | O* | O* | O* | O* | O* | O* | O* | O* | O* | O* | O* | O* | O* | O* | O* | O* | O* |
| | 2.3 | O | × | O | O* | O* | O* | O* | O* | O* | O* | O* | O* | O* | O* | O* | O* | O* | O* |
| | 3.5 | O | × | O | O* | O* | O* | O* | O* | O* | O* | O* | O* | O* | O* | O* | O* | O* | O* |
| | 4.8 | O | × | O | O* | O* | O* | O* | O* | O* | O* | O* | O* | O* | O* | O* | O* | O* | O* |
| | 6 | O | × | O | O* | O* | O* | O* | O* | O* | O* | O* | O* | O* | O* | O* | O* | O* | O* |

W/t = 1.4

| | | 0.5 | | | 1 | | | 1.5 | | | 2 | | | 2.5 | | | 3 | | |
|---|---|---|---|---|---|---|---|---|---|---|---|---|---|---|---|---|---|---|---|
| Gap/t | 1 | O | × | O | O | × | O | O | × | O | O* | O* | O* | O* | O* | O* | O* | O* | O* |
| | 2.3 | O | × | O | O | × | O | O | × | O | O | × | O | O | × | O | O* | O* | O* |
| | 3.5 | O | × | O | O | × | O | O | × | O | O | × | O | O | × | O | O* | O* | O* |
| | 4.8 | O | × | O | O | × | O | O | × | O | O | × | O | O | × | O | O* | O* | O* |
| | 6 | O | × | O | O | × | O | O | × | O | O | × | O | O | × | O | O* | O* | O* |

W/t = 1.7

| | | 0.5 | | | 1 | | | 1.5 | | | 2 | | | 2.5 | | | 3 | | |
|---|---|---|---|---|---|---|---|---|---|---|---|---|---|---|---|---|---|---|---|
| Gap/t | 1 | O | × | × | O | × | × | O | × | × | O | × | × | O | × | × | O | × | × |
| | 2.3 | O | × | O | O | × | × | O | × | × | O | × | × | O | × | × | O | × | × |
| | 3.5 | O | × | O | O | × | × | O | × | × | O | × | × | O | × | × | O | × | × |
| | 4.8 | O | × | O | O | × | × | O | × | × | O | × | × | O | × | × | O | × | × |
| | 6 | O | × | O | O | × | × | O | × | × | O | × | × | O | × | × | O | × | × |

W/t = 2

| | | 0.5 | | | 1 | | | 1.5 | | | 2 | | | 2.5 | | | 3 | | |
|---|---|---|---|---|---|---|---|---|---|---|---|---|---|---|---|---|---|---|---|
| Gap/t | 1 | O | × | × | O | × | × | O | × | × | O | × | × | O | × | × | O | × | × |
| | 2.3 | O | × | × | O | × | × | O | × | × | O | × | × | O | × | × | O | × | × |
| | 3.5 | O | × | × | O | × | × | O | × | × | O | × | × | O | × | × | O | × | × |
| | 4.8 | O | × | × | O | × | × | O | × | × | O | × | × | O | × | × | O | × | × |
| | 6 | O | × | × | O | × | × | O | × | × | O | × | × | O | × | × | O | × | × |

(O* indicates shaded cells with O symbol)

FIG. 24

| W/t | | | | D/t | | | | | | | | | | | | | | | | |
|---|---|---|---|---|---|---|---|---|---|---|---|---|---|---|---|---|---|---|---|---|
| | | | | 0.2 | | | | | | | | | | | | | | | | |
| | | | | $T_{EL}$ | | | | | | | | | | | | | | | | |
| | | | | 0.5 | | | 1 | | | 1.5 | | | 2 | | | 2.5 | | | 3 | | |
| | | | | Z0 | NM | Vpi | Z0 | NM | Vpi | Z0 | NM | Vpi | Z0 | NM | Vpi | Z0 | NM | Vpi | Z0 | NM | Vpi |
| | 0.2 | Gap/t | 1 | × | O | × | × | O | × | × | O | × | × | O | × | × | O | × | × | O | × |
| | | | 2.3 | × | O | × | × | O | × | × | O | × | × | O | × | × | O | × | × | O | × |
| | | | 3.5 | × | O | × | × | O | × | × | O | × | × | O | × | × | O | × | × | O | × |
| | | | 4.8 | × | O | × | × | O | × | × | O | × | × | O | × | × | O | × | × | O | × |
| | | | 6 | × | O | × | × | O | × | × | O | × | × | O | × | × | O | × | × | O | × |
| | 0.5 | Gap/t | 1 | O | × | × | O | O | × | O | O | × | O | O | × | O | O | × | O | O | × |
| | | | 2.3 | × | × | × | O | × | × | O | × | × | O | O | × | O | O | × | O | O | × |
| | | | 3.5 | × | × | × | O | × | × | O | × | × | O | O | × | O | O | × | O | O | × |
| | | | 4.8 | × | × | × | O | × | × | O | × | × | O | O | × | O | O | × | O | O | × |
| | | | 6 | × | × | × | O | × | × | O | × | × | O | O | × | O | O | × | O | O | × |
| | 0.8 | Gap/t | 1 | O | × | × | O | × | × | O | × | × | O | × | × | O | × | × | O | × | × |
| | | | 2.3 | O | × | × | O | × | × | O | × | × | O | × | × | O | × | × | O | × | × |
| | | | 3.5 | O | × | × | O | × | × | O | × | × | O | × | × | O | × | × | O | × | × |
| | | | 4.8 | O | × | × | O | × | × | O | × | × | O | × | × | O | × | × | O | × | × |
| | | | 6 | O | × | × | O | × | × | O | × | × | O | × | × | O | × | × | O | × | × |
| | 1.1 | Gap/t | 1 | O | × | × | O | × | × | O | × | × | O | × | × | O | × | × | O | × | × |
| | | | 2.3 | O | × | × | O | × | × | O | × | × | O | × | × | O | × | × | O | × | × |
| | | | 3.5 | O | × | × | O | × | × | O | × | × | O | × | × | O | × | × | O | × | × |
| | | | 4.8 | O | × | × | O | × | × | O | × | × | O | × | × | O | × | × | O | × | × |
| | | | 6 | O | × | × | O | × | × | O | × | × | O | × | × | O | × | × | O | × | × |
| | 1.4 | Gap/t | 1 | O | × | × | O | × | × | O | × | × | O | × | × | O | × | × | O | × | × |
| | | | 2.3 | O | × | × | O | × | × | O | × | × | O | × | × | O | × | × | O | × | × |
| | | | 3.5 | O | × | × | O | × | × | O | × | × | O | × | × | O | × | × | O | × | × |
| | | | 4.8 | O | × | × | O | × | × | O | × | × | O | × | × | O | × | × | O | × | × |
| | | | 6 | O | × | × | O | × | × | O | × | × | O | × | × | O | × | × | O | × | × |
| | 1.7 | Gap/t | 1 | O | × | × | O | × | × | O | × | × | O | × | × | × | × | × | × | × | × |
| | | | 2.3 | O | × | × | O | × | × | O | × | × | O | × | × | O | × | × | O | × | × |
| | | | 3.5 | O | × | × | O | × | × | O | × | × | O | × | × | O | × | × | O | × | × |
| | | | 4.8 | O | × | × | O | × | × | O | × | × | O | × | × | O | × | × | O | × | × |
| | | | 6 | O | × | × | O | × | × | O | × | × | O | × | × | O | × | × | O | × | × |
| | 2 | Gap/t | 1 | × | × | × | × | × | × | × | × | × | × | × | × | × | × | × | × | × | × |
| | | | 2.3 | × | × | × | × | × | × | × | × | × | × | × | × | × | × | × | × | × | × |
| | | | 3.5 | × | × | × | × | × | × | × | × | × | × | × | × | × | × | × | × | × | × |
| | | | 4.8 | × | × | × | × | × | × | × | × | × | × | × | × | × | × | × | × | × | × |
| | | | 6 | × | × | × | × | × | × | × | × | × | × | × | × | × | × | × | × | × | × |

FIG. 25

| | | | | D/t | | | | | | | | | | | | | | | |
|---|---|---|---|---|---|---|---|---|---|---|---|---|---|---|---|---|---|---|---|
| | | | | 0.4 | | | | | | | | | | | | | | | |
| | | | | $T_{EL}$ | | | | | | | | | | | | | | | |
| | | | | 0.5 | | | 1 | | | 1.5 | | | 2 | | | 2.5 | | | 3 | | |
| | | | | Z0 | NM | Vpi | Z0 | NM | Vpi | Z0 | NM | Vpi | Z0 | NM | Vpi | Z0 | NM | Vpi | Z0 | NM | Vpi |
| W/t | 0.2 | Gap/t | 1 | × | O | × | × | O | × | × | O | × | × | O | × | × | O | × | × | O | × |
| | | | 2.3 | × | O | × | × | O | × | × | O | × | × | O | × | × | O | × | × | O | × |
| | | | 3.5 | × | O | × | × | O | × | × | O | × | × | O | × | × | O | × | × | O | × |
| | | | 4.8 | × | O | × | × | O | × | × | O | × | × | O | × | × | O | × | × | O | × |
| | | | 6 | × | O | × | × | O | × | × | O | × | × | O | × | × | O | × | × | O | × |
| | 0.5 | Gap/t | 1 | × | O | × | × | O | × | O | O | × | O | O | × | O | O | × | O | O | × |
| | | | 2.3 | × | O | × | × | O | × | × | O | × | O | O | × | O | O | × | O | O | × |
| | | | 3.5 | × | O | × | × | O | × | × | O | × | O | O | × | O | O | × | O | O | × |
| | | | 4.8 | × | O | × | × | O | × | × | O | × | O | O | × | O | O | × | O | O | × |
| | | | 6 | × | O | × | × | O | × | × | O | × | O | O | × | O | O | × | O | O | × |
| | 0.8 | Gap/t | 1 | O | × | × | O | × | × | O | × | × | O | × | × | O | O | × | O | O | × |
| | | | 2.3 | O | × | × | O | × | × | O | × | × | O | × | × | O | × | × | O | × | × |
| | | | 3.5 | O | × | × | O | × | × | O | × | × | O | × | × | O | × | × | O | × | × |
| | | | 4.8 | O | × | × | O | × | × | O | × | × | O | × | × | O | × | × | O | × | × |
| | | | 6 | O | × | × | O | × | × | O | × | × | O | × | × | O | × | × | O | × | × |
| | 1.1 | Gap/t | 1 | O | × | × | O | × | × | O | × | × | O | × | × | O | × | × | O | × | × |
| | | | 2.3 | O | × | × | O | × | × | O | × | × | O | × | × | O | × | × | O | × | × |
| | | | 3.5 | O | × | × | O | × | × | O | × | × | O | × | × | O | × | × | O | × | × |
| | | | 4.8 | O | × | × | O | × | × | O | × | × | O | × | × | O | × | × | O | × | × |
| | | | 6 | O | × | × | O | × | × | O | × | × | O | × | × | O | × | × | O | × | × |
| | 1.4 | Gap/t | 1 | O | × | × | O | × | × | O | × | × | O | × | × | O | × | × | O | × | × |
| | | | 2.3 | O | × | × | O | × | × | O | × | × | O | × | × | O | × | × | O | × | × |
| | | | 3.5 | O | × | × | O | × | × | O | × | × | O | × | × | O | × | × | O | × | × |
| | | | 4.8 | O | × | × | O | × | × | O | × | × | O | × | × | O | × | × | O | × | × |
| | | | 6 | O | × | × | O | × | × | O | × | × | O | × | × | O | × | × | O | × | × |
| | 1.7 | Gap/t | 1 | O | × | × | O | × | × | O | × | × | O | × | × | O | × | × | O | × | × |
| | | | 2.3 | O | × | × | O | × | × | O | × | × | O | × | × | O | × | × | O | × | × |
| | | | 3.5 | O | × | × | O | × | × | O | × | × | O | × | × | O | × | × | O | × | × |
| | | | 4.8 | O | × | × | O | × | × | O | × | × | O | × | × | O | × | × | O | × | × |
| | | | 6 | O | × | × | O | × | × | O | × | × | O | × | × | O | × | × | O | × | × |
| | 2 | Gap/t | 1 | × | × | × | × | × | × | × | × | × | × | × | × | × | × | × | × | × | × |
| | | | 2.3 | × | × | × | × | × | × | × | × | × | × | × | × | × | × | × | × | × | × |
| | | | 3.5 | × | × | × | × | × | × | × | × | × | × | × | × | × | × | × | × | × | × |
| | | | 4.8 | × | × | × | × | × | × | × | × | × | × | × | × | × | × | × | × | × | × |
| | | | 6 | × | × | × | × | × | × | × | × | × | × | × | × | × | × | × | × | × | × |

| Gap/t | TEL=0.5 Z0 | NM | Vpi | TEL=1 Z0 | NM | Vpi | TEL=1.5 Z0 | NM | Vpi | TEL=2 Z0 | NM | Vpi | TEL=2.5 Z0 | NM | Vpi | TEL=3 Z0 | NM | Vpi |
|---|---|---|---|---|---|---|---|---|---|---|---|---|---|---|---|---|---|---|
| 1   | x | O | x | x | O | x | x | O | x | x | O | x | x | O | x | x | O | x |
| 2.3 | x | O | x | x | O | x | x | O | x | x | O | x | x | O | x | x | O | x |
| 3.5 | x | O | x | x | O | x | x | O | x | x | O | x | x | O | x | x | O | x |
| 4.8 | x | O | x | x | O | x | x | O | x | x | O | x | x | O | x | x | O | x |
| 6   | x | O | x | x | O | x | x | O | x | x | O | x | x | O | x | x | O | x |

W/t = 0.5

| Gap/t | TEL=0.5 Z0 | NM | Vpi | TEL=1 Z0 | NM | Vpi | TEL=1.5 Z0 | NM | Vpi | TEL=2 Z0 | NM | Vpi | TEL=2.5 Z0 | NM | Vpi | TEL=3 Z0 | NM | Vpi |
|---|---|---|---|---|---|---|---|---|---|---|---|---|---|---|---|---|---|---|
| 1   | x | O | x | x | O | x | x | O | x | x | O | x | O | O | x | O | O | x |
| 2.3 | x | O | x | x | O | x | x | O | x | x | O | x | x | O | x | O | O | x |
| 3.5 | x | O | x | x | O | x | x | O | x | x | O | x | x | O | x | O | O | x |
| 4.8 | x | O | x | x | O | x | x | O | x | x | O | x | x | O | x | O | O | x |
| 6   | x | O | x | x | O | x | x | O | x | x | O | x | x | O | x | O | O | x |

W/t = 0.8

| Gap/t | TEL=0.5 Z0 | NM | Vpi | TEL=1 Z0 | NM | Vpi | TEL=1.5 Z0 | NM | Vpi | TEL=2 Z0 | NM | Vpi | TEL=2.5 Z0 | NM | Vpi | TEL=3 Z0 | NM | Vpi |
|---|---|---|---|---|---|---|---|---|---|---|---|---|---|---|---|---|---|---|
| 1   | O | x | x | O | x | x | O | O | x | O | O | x | O | O | x | O | O | x |
| 2.3 | O | x | x | O | x | x | O | O | x | O | O | x | O | O | x | O | O | x |
| 3.5 | O | x | x | O | x | x | O | O | x | O | O | x | O | O | x | O | O | x |
| 4.8 | O | x | x | O | x | x | O | O | x | O | O | x | O | O | x | O | O | x |
| 6   | O | x | x | O | x | x | O | O | x | O | O | x | O | O | x | O | O | x |

W/t = 1.1

| Gap/t | TEL=0.5 Z0 | NM | Vpi | TEL=1 Z0 | NM | Vpi | TEL=1.5 Z0 | NM | Vpi | TEL=2 Z0 | NM | Vpi | TEL=2.5 Z0 | NM | Vpi | TEL=3 Z0 | NM | Vpi |
|---|---|---|---|---|---|---|---|---|---|---|---|---|---|---|---|---|---|---|
| 1   | O | x | x | O | x | x | O | x | x | O | x | x | O | x | x | O | x | x |
| 2.3 | O | x | x | O | x | x | O | x | x | O | x | x | O | x | x | O | x | x |
| 3.5 | O | x | x | O | x | x | O | x | x | O | x | x | O | x | x | O | x | x |
| 4.8 | O | x | x | O | x | x | O | x | x | O | x | x | O | x | x | O | x | x |
| 6   | O | x | x | O | x | x | O | x | x | O | x | x | O | x | x | O | x | x |

W/t = 1.4

| Gap/t | TEL=0.5 Z0 | NM | Vpi | TEL=1 Z0 | NM | Vpi | TEL=1.5 Z0 | NM | Vpi | TEL=2 Z0 | NM | Vpi | TEL=2.5 Z0 | NM | Vpi | TEL=3 Z0 | NM | Vpi |
|---|---|---|---|---|---|---|---|---|---|---|---|---|---|---|---|---|---|---|
| 1   | O | x | x | O | x | x | O | x | x | O | x | x | O | x | x | O | x | x |
| 2.3 | O | x | x | O | x | x | O | x | x | O | x | x | O | x | x | O | x | x |
| 3.5 | O | x | x | O | x | x | O | x | x | O | x | x | O | x | x | O | x | x |
| 4.8 | O | x | x | O | x | x | O | x | x | O | x | x | O | x | x | O | x | x |
| 6   | O | x | x | O | x | x | O | x | x | O | x | x | O | x | x | O | x | x |

W/t = 1.7

| Gap/t | TEL=0.5 Z0 | NM | Vpi | TEL=1 Z0 | NM | Vpi | TEL=1.5 Z0 | NM | Vpi | TEL=2 Z0 | NM | Vpi | TEL=2.5 Z0 | NM | Vpi | TEL=3 Z0 | NM | Vpi |
|---|---|---|---|---|---|---|---|---|---|---|---|---|---|---|---|---|---|---|
| 1   | O | x | x | O | x | x | O | x | x | O | x | x | O | x | x | O | x | x |
| 2.3 | O | x | x | O | x | x | O | x | x | O | x | x | O | x | x | O | x | x |
| 3.5 | O | x | x | O | x | x | O | x | x | O | x | x | O | x | x | O | x | x |
| 4.8 | O | x | x | O | x | x | O | x | x | O | x | x | O | x | x | O | x | x |
| 6   | O | x | x | O | x | x | O | x | x | O | x | x | O | x | x | O | x | x |

W/t = 2

| Gap/t | TEL=0.5 Z0 | NM | Vpi | TEL=1 Z0 | NM | Vpi | TEL=1.5 Z0 | NM | Vpi | TEL=2 Z0 | NM | Vpi | TEL=2.5 Z0 | NM | Vpi | TEL=3 Z0 | NM | Vpi |
|---|---|---|---|---|---|---|---|---|---|---|---|---|---|---|---|---|---|---|
| 1   | x | x | x | x | x | x | x | x | x | x | x | x | x | x | x | x | x | x |
| 2.3 | O | x | x | x | x | x | x | x | x | x | x | x | x | x | x | x | x | x |
| 3.5 | O | x | x | x | x | x | x | x | x | x | x | x | x | x | x | x | x | x |
| 4.8 | O | x | x | x | x | x | x | x | x | x | x | x | x | x | x | x | x | x |
| 6   | O | x | x | x | x | x | x | x | x | x | x | x | x | x | x | x | x | x |

FIG. 27

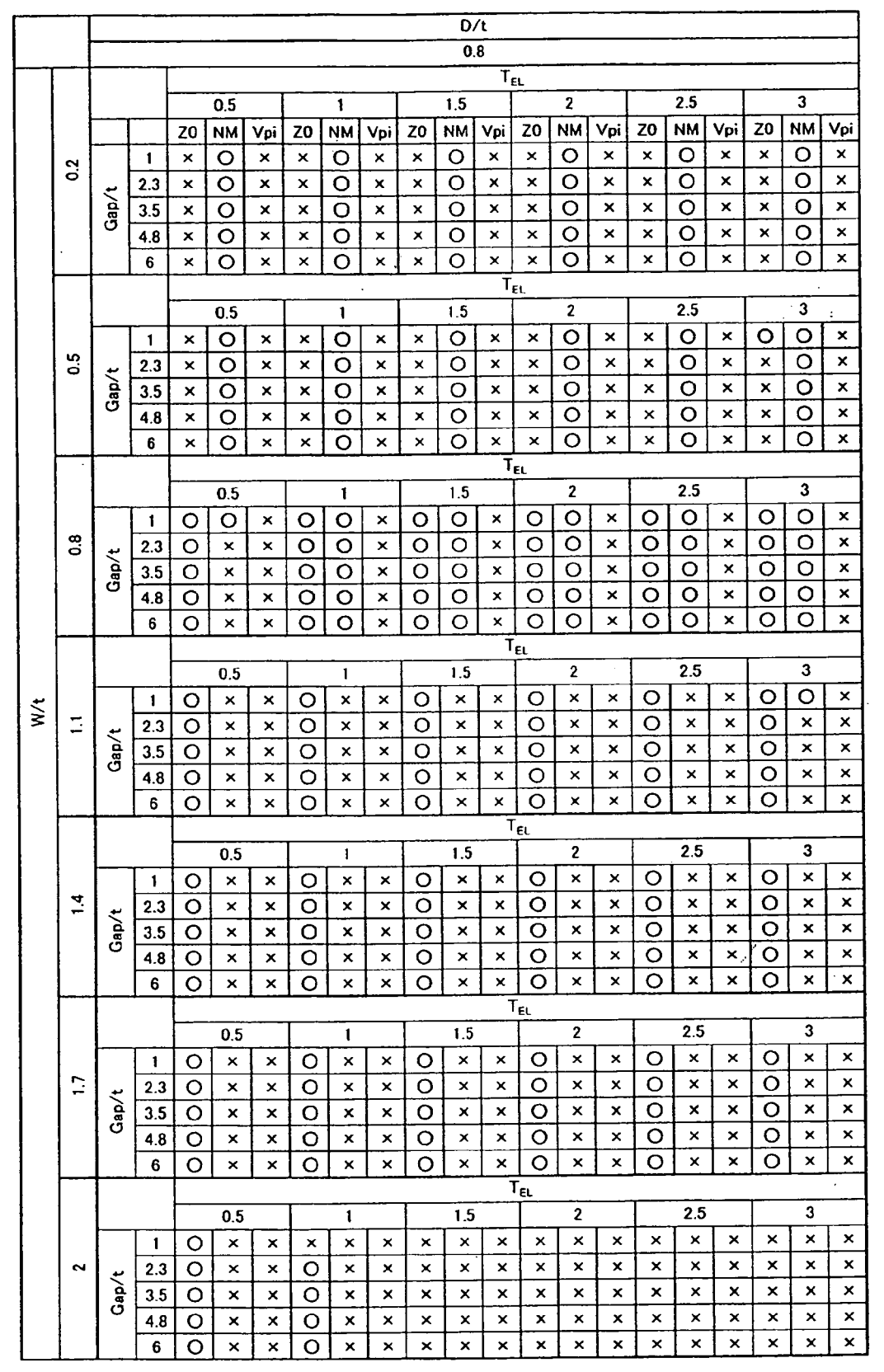

| W/t | | Gap/t | D/t = 0.8 | | | | | | | | | | | | | | | | | |
|---|---|---|---|---|---|---|---|---|---|---|---|---|---|---|---|---|---|---|---|---|
| | | | $T_{EL}$ | | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| 0.2 | | 1 | × | ○ | × | × | ○ | × | × | ○ | × | × | ○ | × | × | ○ | × | × | ○ | × |
| | | 2.3 | × | ○ | × | × | ○ | × | × | ○ | × | × | ○ | × | × | ○ | × | × | ○ | × |
| | | 3.5 | × | ○ | × | × | ○ | × | × | ○ | × | × | ○ | × | × | ○ | × | × | ○ | × |
| | | 4.8 | × | ○ | × | × | ○ | × | × | ○ | × | × | ○ | × | × | ○ | × | × | ○ | × |
| | | 6 | × | ○ | × | × | ○ | × | × | ○ | × | × | ○ | × | × | ○ | × | × | ○ | × |
| 0.5 | | 1 | × | ○ | × | × | ○ | × | × | ○ | × | × | ○ | × | × | ○ | × | ○ | ○ | × |
| | | 2.3 | × | ○ | × | × | ○ | × | × | ○ | × | × | ○ | × | × | ○ | × | × | ○ | × |
| | | 3.5 | × | ○ | × | × | ○ | × | × | ○ | × | × | ○ | × | × | ○ | × | × | ○ | × |
| | | 4.8 | × | ○ | × | × | ○ | × | × | ○ | × | × | ○ | × | × | ○ | × | × | ○ | × |
| | | 6 | × | ○ | × | × | ○ | × | × | ○ | × | × | ○ | × | × | ○ | × | × | ○ | × |
| 0.8 | | 1 | ○ | ○ | × | ○ | ○ | × | ○ | ○ | × | ○ | ○ | × | ○ | ○ | × | ○ | ○ | × |
| | | 2.3 | ○ | × | × | ○ | ○ | × | ○ | ○ | × | ○ | ○ | × | ○ | ○ | × | ○ | ○ | × |
| | | 3.5 | ○ | × | × | ○ | ○ | × | ○ | ○ | × | ○ | ○ | × | ○ | ○ | × | ○ | ○ | × |
| | | 4.8 | ○ | × | × | ○ | ○ | × | ○ | ○ | × | ○ | ○ | × | ○ | ○ | × | ○ | ○ | × |
| | | 6 | ○ | × | × | ○ | ○ | × | ○ | ○ | × | ○ | ○ | × | ○ | ○ | × | ○ | ○ | × |
| 1.1 | | 1 | ○ | × | × | ○ | × | × | ○ | × | × | ○ | × | × | ○ | × | × | ○ | ○ | × |
| | | 2.3 | ○ | × | × | ○ | × | × | ○ | × | × | ○ | × | × | ○ | × | × | ○ | × | × |
| | | 3.5 | ○ | × | × | ○ | × | × | ○ | × | × | ○ | × | × | ○ | × | × | ○ | × | × |
| | | 4.8 | ○ | × | × | ○ | × | × | ○ | × | × | ○ | × | × | ○ | × | × | ○ | × | × |
| | | 6 | ○ | × | × | ○ | × | × | ○ | × | × | ○ | × | × | ○ | × | × | ○ | × | × |
| 1.4 | | 1 | ○ | × | × | ○ | × | × | ○ | × | × | ○ | × | × | ○ | × | × | ○ | × | × |
| | | 2.3 | ○ | × | × | ○ | × | × | ○ | × | × | ○ | × | × | ○ | × | × | ○ | × | × |
| | | 3.5 | ○ | × | × | ○ | × | × | ○ | × | × | ○ | × | × | ○ | × | × | ○ | × | × |
| | | 4.8 | ○ | × | × | ○ | × | × | ○ | × | × | ○ | × | × | ○ | × | × | ○ | × | × |
| | | 6 | ○ | × | × | ○ | × | × | ○ | × | × | ○ | × | × | ○ | × | × | ○ | × | × |
| 1.7 | | 1 | ○ | × | × | ○ | × | × | ○ | × | × | ○ | × | × | ○ | × | × | ○ | × | × |
| | | 2.3 | ○ | × | × | ○ | × | × | ○ | × | × | ○ | × | × | ○ | × | × | ○ | × | × |
| | | 3.5 | ○ | × | × | ○ | × | × | ○ | × | × | ○ | × | × | ○ | × | × | ○ | × | × |
| | | 4.8 | ○ | × | × | ○ | × | × | ○ | × | × | ○ | × | × | ○ | × | × | ○ | × | × |
| | | 6 | ○ | × | × | ○ | × | × | ○ | × | × | ○ | × | × | ○ | × | × | ○ | × | × |
| 2 | | 1 | ○ | × | × | × | × | × | × | × | × | × | × | × | × | × | × | × | × | × |
| | | 2.3 | ○ | × | × | ○ | × | × | × | × | × | × | × | × | × | × | × | × | × | × |
| | | 3.5 | ○ | × | × | ○ | × | × | × | × | × | × | × | × | × | × | × | × | × | × |
| | | 4.8 | ○ | × | × | ○ | × | × | × | × | × | × | × | × | × | × | × | × | × | × |
| | | 6 | ○ | × | × | ○ | × | × | × | × | × | × | × | × | × | × | × | × | × | × |

OPTICAL CONTROL DEVICE

TECHNICAL FIELD

The present invention relates to an optical control device and in particular, to an optical control device including a thin plate which has an electro-optical effect and has a thickness of 10 μm or less, an optical waveguide formed in the thin plate, and control electrodes for controlling light passing through the optical waveguide.

BACKGROUND ART

In an optical communication field or an optical measurement field, various kinds of optical control devices, such as a waveguide type optical modulator or a waveguide type optical switch, in which an optical waveguide or a control electrode is formed on a substrate having an electro-optical effect have been often used in the related art.

In many types of optical control devices currently used, an optical waveguide 2 or a signal electrode 4 and a ground electrode 5 are formed in an electro-optical crystal substrate 1 with a thickness of about 0.5 to 1 mm as shown in FIG. 1A. In addition, FIG. 1A is an example of an optical modulator using a Z-cut type $LiNbO_3$ substrate, and reference numeral 3 denotes a buffer layer, such as an $SiO_2$ film.

Particularly in the waveguide type optical modulator, a microwave signal is applied to a control electrode in order to control modulation of a light wave propagating through an optical waveguide. Accordingly, in order for a microwave to efficiently propagate through a control electrode, impedance matching between of a signal line, such as a coaxial cable, through which a microwave is introduced into the optical modulator, and the control electrode in the optical modulator is required.

For this reason, as shown in FIG. 1A, a shape in which the signal electrode 4 is interposed between the ground electrodes 5, a so-called coplanar type control electrode is used.

In the case of the coplanar type control electrode, however, an external electric field does not act efficiently in the direction (vertical direction in the case of the Z-cut type $LiNbO_3$ substrate shown in FIG. 1A) where the efficiency of the electro-optical effect of the substrate 1 is high. Accordingly, a larger voltage is needed in order to obtain a required degree of optical modulation. Specifically, in the case where an $LiNbO_3$ (hereinafter, referred to as 'LN') substrate is used and the electrode length along the optical waveguide is 1 cm, a halfwave voltage of about 10 to 15 V is required.

In addition, as shown in FIG. 1B, a configuration in which an optical waveguide is made as a ridge type waveguide 20 and ground electrodes 5, 51, and 52 are disposed closer to electrodes 4 and 41 in order to improve confinement of a light wave of the optical waveguide and apply an electric field, which is generated by a control electrode, to the optical waveguide more efficiently is proposed in Patent Document 1. By this configuration, a reduction of a certain amount of driving voltage can be realized. However, in order to realize high speed modulation particularly in a high frequency band, a much more driving voltage should be reduced.

[Patent Document 1] U.S. Pat. No. 6,580,843

Furthermore, as shown in FIG. 1C, interposing a substrate between control electrodes and applying an electric field in the direction (vertical direction in the case of a Z-cut type $LiNbO_3$ substrate shown in FIG. 1C) where the efficiency of the electro-optical effect is high are proposed in Patent Document 2. In addition, in an optical modulator shown in FIG. 1C, a substrate having an electro-optical effect is polarization inverted, substrate regions 10 and 11 where directions (directions indicated by arrows in the drawing) of spontaneous polarization are different are formed, and an optical waveguide 2 is formed in each substrate region. Accordingly, in the case when an electric field is applied to each optical waveguide with common signal electrode 42 and ground electrode 53, it becomes possible to cause a phase change in opposite directions to occur in light waves propagating through respective optical waveguides. By such differential driving, it becomes possible to further reduce a driving voltage.

[Patent Document 2] Japanese examined Patent Publication No. 3638300

However, in the electrode structure shown in FIG. 10, the refractive index of a microwave increases and accordingly, speed matching between a light wave propagating through the optical waveguide and a microwave which is a modulated signal becomes difficult. In addition, since impedance decreases conversely, there is a disadvantage that impedance matching with a signal line of a microwave becomes also difficult.

On the other hand, In the following Patent Document 3 or 4, an effective refractive index of a microwave is reduced by providing an optical waveguide and modulation electrodes on a very thin substrate (hereinafter, referred to as a 'thin plate') having a thickness of 30 μm or less and bonding another substrate having a dielectric constant lower than the thin plate to the thin plate, such that the speed matching between the microwave and the light wave is realized.

[Patent Document 3] JP-A-64-18121
[Patent Document 4] JP-A-2003-215519

However, even in the cases where the control electrodes with the structures shown in FIG. 1A to 1C are formed for the optical modulator using such a thin plate, the above-described problems are not solved yet basically. In the case where the substrate is interposed between the control electrodes as shown in FIG. 1C, if the thickness of the substrate is made small, it is difficult to realize speed matching between a light wave and a microwave even though the microwave refractive index tends to decrease. Although it also depends on the width of an electrode, the effective refractive index is about 5 in the case of using a thin plate of LN, for example, which does not approximate 2.14 that is an optimum value. On the other hand, the impedance tends to decrease as the substrate becomes thin, which becomes a cause of increasing impedance mismatch.

DISCLOSURE OF THE INVENTION

Problem that the Invention is to Solve

In order to solve the above problems, it is an object of the present invention to provide an optical control device capable of realizing speed matching between a microwave and a light wave or impedance matching of microwaves and of reducing a driving voltage.

Furthermore, it is another object of the present invention to provide an optical control device which can operate stably since an increase in temperature of the optical control device can be suppressed by reduction in a driving voltage and to provide an optical control device allowing a cheaper low driving voltage type driving device to be used.

Means for Solving the Problem

In order to solve the above problems, the invention related to claim 1 is characterized in that in an optical control device including a thin plate which has an electro-optical effect and has a thickness of 10 μm or less, an optical waveguide formed in the thin plate, and control electrodes for controlling light passing through the optical waveguide, the control electrodes are configured to include a first electrode and a second electrode disposed to interpose the thin plate therebetween, the first electrode has a coplanar type electrode including at least a signal electrode and a ground electrode, and the second electrode has at least a ground electrode and is configured to apply an electric field to the optical waveguide in cooperation with the signal electrode of the first electrode.

The 'coplanar type electrode' in the present invention means that obtained by interposing a signal electrode between ground electrodes. For example, electrode gaps between the signal electrode and the ground electrodes on both sides may be equal or different, or the ground electrode may be disposed only on one side. In addition, that obtained by forming a signal electrode with a plurality of lines and interposing the plurality of line between ground electrodes, that obtained by additionally arranging a ground electrode between a plurality of lines, and the like are included.

In the optical control device described in claim 1, the invention related to claim 2 is characterized in that the optical waveguide is a ridge type optical waveguide.

In the optical control device described in claim 1 or 2, the invention related to claim 3 is characterized in that a buffer layer is formed between the thin plate and the first electrode or the second electrode.

In the optical control device described in any one of claims 1 to 3, the invention related to claim 4 is characterized in that the signal electrode or the ground electrode is formed by either a transparent electrode or an electrode obtained by disposing a transparent electrode at a thin plate side.

In the optical control device described in any one of claims 2 to 4, the invention related to claim 5 is characterized in that at least grooves disposed at both sides of the ridge type waveguide are filled with a low dielectric constant film.

In the optical control device described in claim 5, the invention related to claim 6 is characterized in that a signal line for supplying electric power to the signal electrode is disposed to go over or below the ground electrode of the first electrode and the low dielectric constant film is disposed between the signal line and the ground electrode.

In the optical control device described in any one of claims 1 to 6, the invention related to claim 7 is characterized in that the second electrode is a pattern-like electrode having a shape corresponding to the shape of the optical waveguide.

In the optical control device described in any one of claims 1 to 7, the invention related to claim 8 is characterized in that the ground electrode of the first electrode and the ground electrode of the second electrode are electrically connected to each other through a through hole provided in the thin plate.

In the optical waveguide device described in any one of claims 1 to 8, the invention related to claim 9 is characterized in that spontaneous polarization of the thin plate including at least a part of the optical waveguide is inverted.

In the optical control device described in any one of claims 1 to 9, the invention related to claim 10 is characterized in that the thin plate is bonded to a supporting substrate through an adhesive layer with the first electrode or the second electrode interposed therebetween.

In the optical control device described in claim 10, the invention related to claim 11 is characterized in that the second electrode is disposed on the supporting substrate.

In the optical control device described in any one of claims 1 to 11, the invention related to claim 12 is characterized in that at least width W and height $T_{EL}$ of the signal electrode of the first electrode, a gap G between the signal electrode and the ground electrode in the first electrode, and a depth D of a ridge when the optical control device is a ridge type optical waveguide are set such that a half-wave voltage Vpai related to the signal electrode is 8 V·cm or less, impedance Z is 30Ω or more and 60Ω or less, and a product of a refractive index difference Δn between light and a microwave and a length L of an operating portion in which an electric field of the signal electrode acts on the optical waveguide is 1.3 cm or less.

EFFECTS OF THE INVENTION

By the invention related to claim 1, since an optical control device including a thin plate which has an electro-optical effect and has, a thickness of 10 μm or less, an optical waveguide formed in the thin plate, and control electrodes for controlling light passing through the optical waveguide is configured such that the control electrodes are configured to include a first electrode and a second electrode disposed to interpose the thin plate therebetween, the first electrode has a coplanar type electrode including at least a signal electrode and a ground electrode, and the second electrode has at least a ground electrode and is configured to apply an electric field to the optical waveguide in cooperation with the signal electrode of the first electrode, speed matching between a microwave and a light wave or impedance matching of microwaves can be realized and accordingly, it is possible to provide an optical control device which can operate in high speed. In addition, since a driving voltage can be reduced, high-speed driving using an existing cheap driving device becomes possible. As a result, the cost related to a driving device can also be reduced.

By the invention related to claim 2, since the optical waveguide is a ridge type optical waveguide, the confinement efficiency of a light wave is increased and it becomes possible to concentrate an electric field, which is formed by control electrodes, on the optical waveguide. Accordingly, an optical control device with a lower driving voltage can be realized.

By the invention related to claim 3, since a buffer layer is formed between the thin plate and the first electrode or the second electrode, it becomes possible to dispose a control electrode to be closer to the optical waveguide while suppressing the propagation loss of a light wave propagating through the optical waveguide.

By the invention related to claim 4, since the signal electrode or the ground electrode is formed by either a transparent electrode or an electrode obtained by disposing a transparent electrode at a thin plate side, it becomes possible to dispose a control electrode to be closer to the optical waveguide while suppressing the propagation loss of a light wave propagating through the optical waveguide even when a buffer layer is not present.

By the invention related to claim 5, since at least grooves disposed at both sides of the ridge type waveguide are filled with a low dielectric constant film, adjustment of the impedance or the microwave refractive index in a control electrode becomes possible and accordingly, more suitable microwave refractive index and impedance can be obtained.

By the invention related to claim 6, since a signal line for supplying electric power to the signal electrode is disposed to go over or below the ground electrode of the first electrode and the low dielectric constant film is disposed between the signal line and the ground electrode, a degree of freedom in wiring of control electrodes is increased and accordingly, complicated wiring of an optical integrated circuit or the like becomes also possible. In addition, since wiring lines can be provided in a three-dimensional manner, it becomes also possible to obtain a more suitable refractive index or impedance of a microwave.

By the invention related to claim 7, since the second electrode is a pattern-like electrode having a shape corresponding to the shape of the optical waveguide, the electric field applied to the optical waveguide can be more concentrated and accordingly, it becomes possible to further reduce a driving voltage.

By the invention related to claim 8, since the ground electrode of the first electrode and the ground electrode of the second electrode are electrically connected to each other through a through hole provided in the thin plate, it is possible to simplify electric wiring lines related to the optical control device and to suppress deviation of floating charges generated in the ground electrode of the first electrode and the ground electrode of the second electrode. As a result, a more suitable electric field can be applied to the optical waveguide.

By the invention related to claim 9, since spontaneous polarization of the thin plate including at least a part of the optical waveguide is inverted, differential driving of the optical control device can be easily realized by a simple control electrode or driving circuit and accordingly, a reduction in a driving voltage becomes also possible.

By the invention related to claim 10, since the thin plate is bonded to a supporting substrate through an adhesive layer with the first electrode or the second electrode interposed therebetween, the mechanical strength of the thin plate can be reinforced. As a result, it becomes possible to provide a highly reliable optical control device.

By the invention related to claim 11, since the second electrode is disposed on the supporting substrate, a degree of freedom in wiring related to control electrodes is increased and accordingly, complicated wiring of an optical integrated circuit or the like becomes also possible. In addition, since the number of control electrodes disposed on a thin plate can be decreased, it becomes also possible to reduce a risk that the thin plate will be damaged due to the thermal stress applied to the thin plate.

By the invention related to claim 12, since at least the width W and height $T_{EL}$ of the signal electrode of the first electrode, the gap G between the signal electrode and the ground electrode in the first electrode, and the depth D of a ridge when the optical control device is a ridge type optical waveguide are set such that the half-wave voltage Vpai related to the signal electrode is 8 V·cm or less, the impedance Z is 30Ω or more and 60Ω or less, and a product of the refractive index difference Δn between light and a microwave and the length L of an operating portion in which an electric field of the signal electrode acts on the optical waveguide is 1.3 cm or less, speed matching between a microwave and a light wave or matching of impedance of a microwave with respect to impedance of a side to which a modulated signal is input can be realized very easily. As a result, an optical control device which can operate in high speed can be provided. In addition, since a driving voltage can be reduced, high-speed driving using an existing cheap driving device becomes possible. As a result, the cost related to a driving device can also be reduced.

BRIEF DESCRIPTION OF THE DRAWINGS

FIG. 4 is a view illustrating an example of an optical control device having a low dielectric constant film;

FIG. 5 is a view illustrating an example of an optical control device in which an optical waveguide is formed at a bottom surface side of a thin plate;

FIG. 6 is a view illustrating an example of an optical control device using a transparent electrode;

FIG. 7 is a view illustrating an example of an optical control device in which a pattern-like electrode is used as a second electrode;

FIG. 8 is a view illustrating an example of an optical control device using polarization inversion;

FIG. 12 is a table illustrating a calculation result (t=2 μm, D/t=0.2);

FIG. 13 is a table illustrating a calculation result (t=2 μm, D/t=0.4);

FIG. 14 is a table illustrating a calculation result (t=2 μm, D/t=0.6);

FIG. 15 is a table illustrating a calculation result (t=2 μm, D/t=0.8);

FIG. 16 is a table illustrating a calculation result (t=4 μm, D/t=0.2);

FIG. 17 is a table illustrating a calculation result (t=4 μm, D/t=0.4);

FIG. 18 is a table illustrating a calculation result (t=4 μm, D/t=0.6);

FIG. 19 is a table illustrating a calculation result (t=4 μm, D/t=0.8);

FIG. 20 is a table illustrating a calculation result (t=6 μm, D/t=0.2);

FIG. 21 is a table illustrating a calculation result (t=6 μm, D/t=0.4);

FIG. 22 is a table illustrating a calculation result (t=6 μm, D/t=0.6);

FIG. 23 is a table illustrating a calculation result (t=6 μm, D/t=0.8);

FIG. 24 is a table illustrating a calculation result (t=8 μm, D/t=0.2);

FIG. 25 is a table illustrating a calculation result (t=8 μm, D/t=0.4);

FIG. 26 is a table illustrating a calculation result (t=8 μm, D/t=0.6);

FIG. 27 is a table illustrating a calculation result (t=8 μm, D/t=0.8);

FIG. 28 is a table illustrating Vpai evaluation in a calculation result (t=2 μm W/t=2.2-4.0);

FIG. 30 is a table illustrating NM evaluation in a calculation result (t=2 μm, W/t=2.2-4.0).

DESCRIPTION OF REFERENCE NUMERALS AND SIGNS

Figure 1:
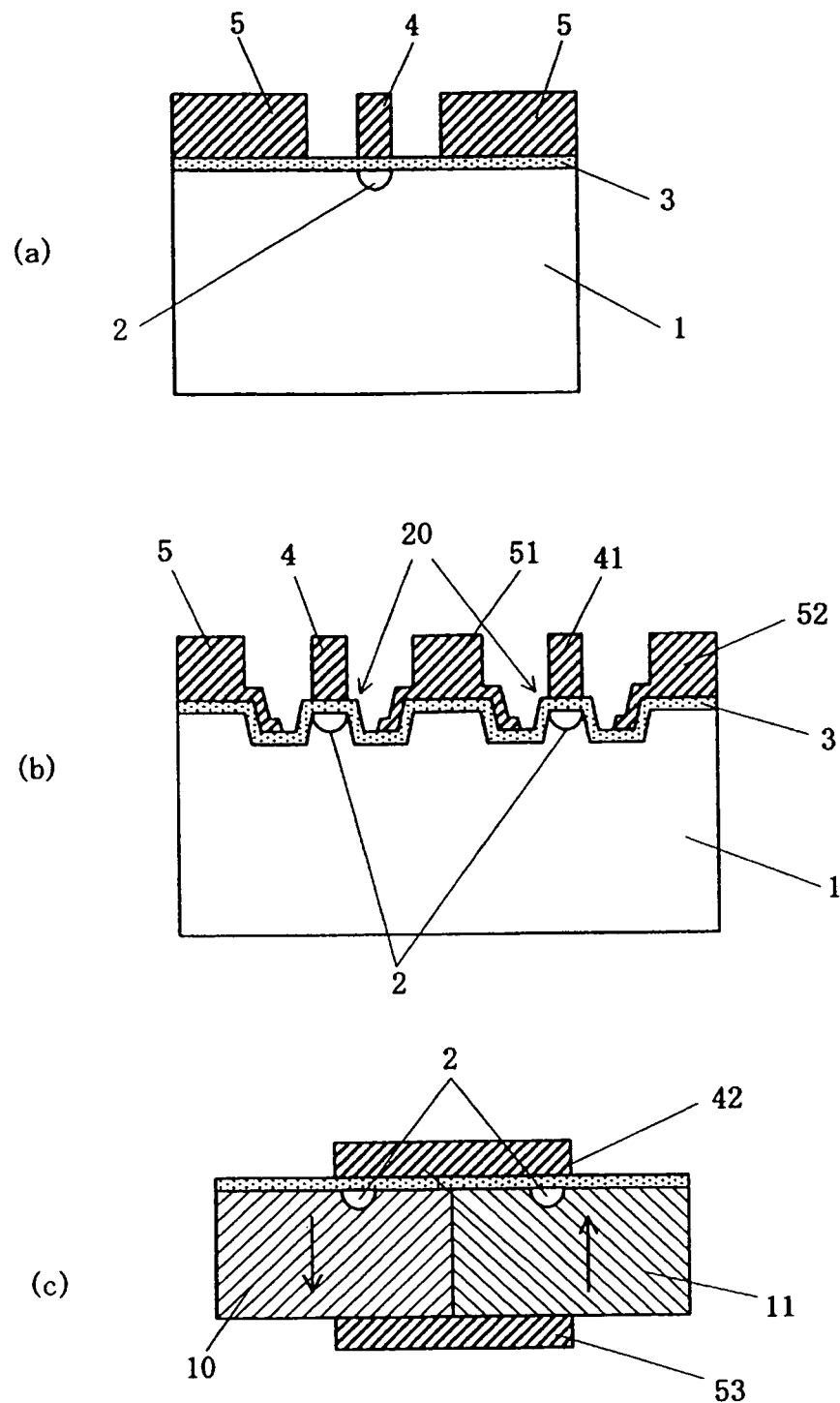
FIG. 1 is a view illustrating an example of a known optical control device.

1: Z-cut type LN crystal substrate
2: optical waveguide
3, 31: buffer layer
4, 41, 42, 43, 44, 140: signal electrode
5, 51, 52, 53, 54, 55, 56, 150: ground electrode
6: adhesive layer 7: supporting substrate
8, 81: low dielectric constant film
9, 91, 92, 93, 94, 95, 96: transparent electrode
11: X-cut type LN crystal substrate
20: ridge type waveguide (ridge portion)
100: connection line formed in a through hole

BEST MODE FOR CARRYING OUT THE
INVENTION

Hereinafter, the present invention will be described in detail using preferred embodiments.

The basic configuration of an optical control device according to the present invention is characterized in that in an optical control device including a thin plate which has an electro-optical effect and has a thickness of 10 μm or less, an optical waveguide formed in the thin plate, and control electrodes for controlling light passing through the optical waveguide, the control electrodes are configured to include a first electrode and a second electrode disposed to interpose the thin plate therebetween, the first electrode has a coplanar type electrode including at least a signal electrode and a ground electrode, and the second electrode has at least a ground electrode and is configured to apply an electric field to the optical waveguide in cooperation with the signal electrode of the first electrode.

Figure 2:
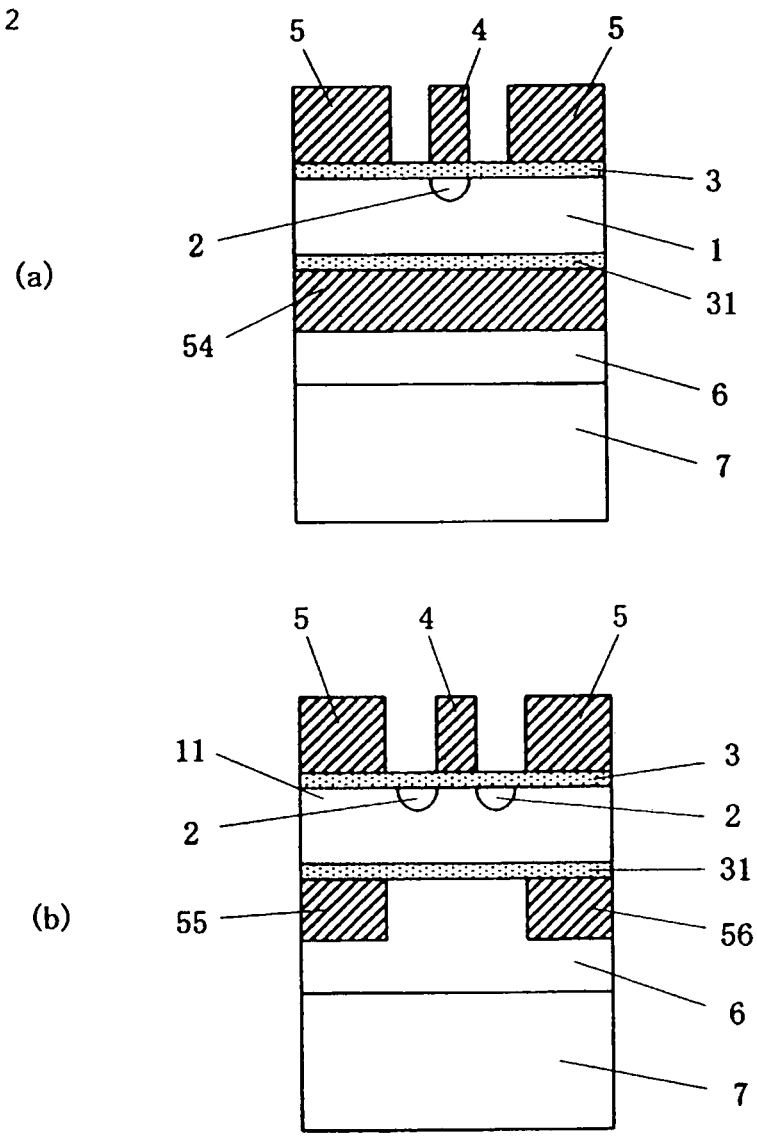
FIG. 2 is a view illustrating an embodiment of an optical control device of the present invention.

FIG. 2 is a cross-sectional view illustrating an embodiment related to the optical control device of the present invention. FIG. 2A shows a case in which a Z-cut type LN substrate (thin plate) 1 is used, and FIG. 2B shows a case in which an X-cut type LN substrate (thin plate) 11 is used. In the optical control device of the present invention, it is preferable that the thickness of the thin plate be 10 μm or less.

In FIG. 2A, an optical waveguide 2 is formed in the thin plate 1, and control electrodes are disposed to interpose the thin plate 1 therebetween. The control electrodes include a first electrode, which is disposed above the thin plate 1, and a second electrode disposed below the thin plate 1. A signal electrode 4 and a ground electrode 5 are provided as the first electrode, and a ground electrode 54 is provided as the second electrode. It is needless to say that required electrodes, such as a DC electrode, other than the shown electrodes may be suitably added to the first electrode and the second electrode.

A feature of the optical control device shown in FIG. 2A is that an electric field by the signal electrode 4 and the ground electrode 54 is applied to the optical waveguide 2 in addition to an electric field by the signal electrode 4 and the ground electrode 5. This can make strong an electric field in the longitudinal direction of the drawing where the optical waveguide 2 can be placed and as a result, it becomes possible to reduce a driving voltage.

In addition, since the refractive index and impedance of a microwave in a control electrode are determined by the signal electrode 4 and the ground electrodes 5 and 54, the microwave refractive index and the impedance may be set to 2.14 and 50Ω, for example, which are optimum values.

Each electrode is disposed with a buffer layer 3 or 31, such as an SiO$_2$ film, interposed between each electrode and the thin plate. The buffer layer has an effect of preventing a light wave, which propagates through the optical waveguide, from being absorbed or scattered by the control electrodes. In addition, as the configuration of the buffer layer, an Si film or the like may be included to reduce a pyroelectric effect of the thin plate 1 as necessary.

In addition, a buffer layer existing between the ground electrode 5 or 54 and the thin plate 1 may be omitted. However, it is preferable to maintain a buffer layer existing between the optical waveguide of the thin plate 1 and the ground electrode 54, since the mode diameter of a light wave propagating through the optical waveguide becomes almost equal to the thickness of the thin plate as the thickness of the thin plate becomes small and accordingly, absorption or diffusion of a light wave by the ground electrode 54 also occurs.

In addition, since the substrate of the optical control device is a thin plate, it is possible to operate the optical control device in the same manner as in FIG. 1A even in the case where an arrangement of the first electrode and the second electrode with respect to the thin plate 1 is made opposite.

The thin plate 1 is bonded to a supporting substrate 7 with an adhesive layer 6 interposed therebetween after the second electrode is formed. Therefore, even in the case where the thickness of the thin plate 1 is 10 μm or less, a sufficient mechanical strength as an optical control device can be secured.

In addition, although the second electrode (first electrode in the case where the arrangement of the first electrode and the second electrode is made opposite) is disposed in contact with a side of the thin plate 1 in FIG. 2A, it is also possible to form the second electrode (or the first electrode) on the supporting substrate 7 and to bond the second electrode (or the first electrode) to the thin plate 1 with an adhesive layer interposed therebetween.

In FIG. 2B, an X-cut type LN substrate is used and a direction in which the efficiency of the electro-optical effect is high is a horizontal direction. Accordingly, in the first electrode, the signal electrode 4 and the ground electrode 5 are disposed at the positions that interpose the optical waveguide 2 therebetween. In the second electrode, the shapes and arrangement of the ground electrodes 55 and 56 are determined such that an arrangement formed by the signal electrode 4 and the ground electrodes 55 and 56 has a horizontal component with respect to the optical waveguide 2. In addition, as will be described later, more optimal electric field distribution can be formed by making the second electrode a pattern-like electrode corresponding to the shape of an optical waveguide.

As a crystalline substrate having an electro-optical effect used for a thin plate, materials, such as a lithium niobate, a lithium tantalate, a PLZT (lead lanthanum zirconate titanate), and a quartz, and a combination thereof may be used, for example. In particular, lithium tantalate (LT) crystal or lithium niobate (LN) crystal having a high electro-optical effect is preferably used.

As a method of forming an optical waveguide, the optical waveguide can be formed by diffusing, for example, Ti on a substrate surface using a thermal diffusion method, a proton exchanging method, or the like. In addition, as disclosed in Patent Document 5, the optical waveguide may also be configured by forming a ridge on a front surface of the thin plate 1 according to the shape of the optical waveguide.

Control electrodes, such as a signal electrode or a ground electrode, may be formed by formation of an electrode pattern using Ti and Au and a metal plating method, for example. In addition, for a transparent electrode to be described later, an ITO or a composite oxide film with In and Ti which is an infrared transparent conductive film may be used. For example, a method of forming an electrode pattern by a photolithography method and forming a transparent electrode by a lift-off method or a method of forming a mask material so that a predetermined electrode pattern remains and forming a transparent electrode in dry etching or wet etching may be used.

[Patent Document 5] JP-A-6-289341

In a method of manufacturing the thin plate 1 including an optical control device, a thin plate having a thickness of 10 μm or less is created by forming the optical waveguide described above on a substrate having a thickness of hundreds of micrometers and grinding a bottom surface of the substrate. Then, a control electrode is made on a top surface of the thin plate. In addition, the bottom surface of the substrate may be grinded after forming the optical waveguide, the control electrode, and the like. In addition, if a thermal impact when forming an optical waveguide or a mechanical impact caused by handling of a thin film in various kinds of processing is applied, there is a risk that the thin plate will be damaged. For this reason, it is preferable to perform processing, in which such thermal or mechanical impact is easily applied, before grinding a substrate to make the substrate have a small thickness.

Various kinds of materials may be used for the supporting substrate 7. For example, in addition to the same material as the thin plate, materials having lower dielectric constants than the thin plate, such as a quartz, glass, and an alumina, may be used, or materials having different crystal orientation from the thin plate may also be used. In this case, it is preferable to select a material having the same coefficient of linear expansion as the thin plate in order to stabilize a modulation characteristic of the optical control device with respect to a temperature change. If it is difficult to select the same material, a material having the same coefficient of linear expansion as the thin plate may be selected for an adhesive used to bond the thin plate and the supporting substrate.

In order to bond the thin plate 1 and the supporting substrate 7 to each other, various kinds of adhesive materials, such as an epoxy-based adhesive, a thermosetting adhesive, an ultraviolet curable adhesive, solder glass, a thermosetting resin adhesive sheet, a light curable resin adhesive sheet, or a light viscosity resin adhesive sheet may be used as an adhesive layer 6.

Hereinafter, applications of the optical control device according to the present invention will be described. Moreover, in the following drawings, the same reference numeral is used if possible in the case of using the same member as the above-mentioned member, and an adhesive layer and a supporting substrate are omitted as needed in order to clarify the feature of the configuration.

(Optical Control Device Having a Ridge Type Waveguide)

Figure 3:
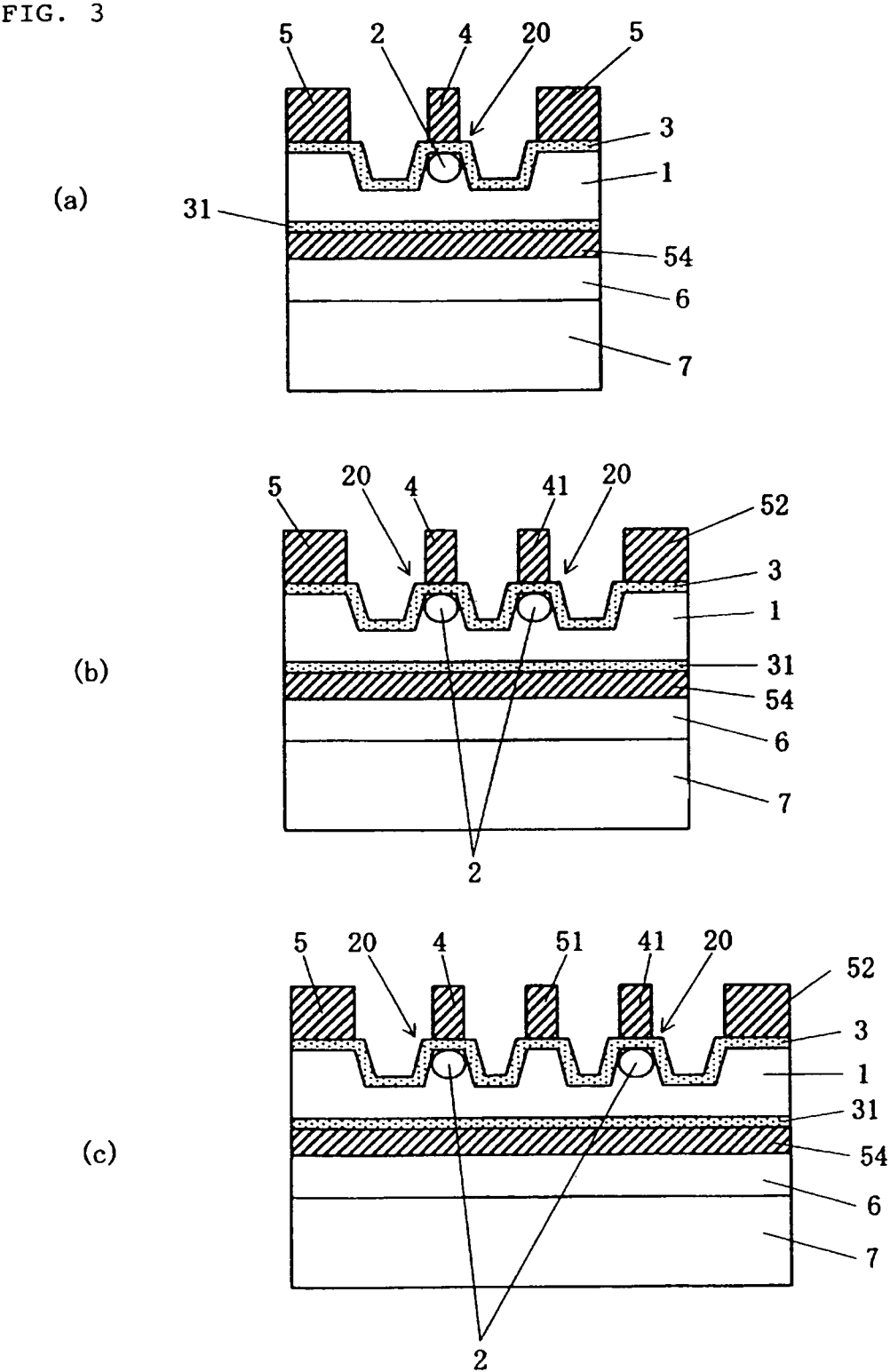
FIG. 3 is a view illustrating an example of an optical control device having a ridge type waveguide.

FIG. 3 illustrates an application related to the optical control device of the present invention, which is an example where a ridge type waveguide is formed as an optical waveguide. Since the confinement efficiency of a light wave is increased and it becomes possible to concentrate an electric field, which is formed by control electrodes, on the optical waveguide by forming the optical waveguide with the ridge type optical waveguide, an optical control device with a lower driving voltage can be realized.

In FIG. 3A, a ridge type waveguide 20 is formed as the optical waveguide of the optical control device of FIG. 2A, and a light wave propagating through a ridge portion 20 is confined. An electric field formed by the signal electrode 4 and the ground electrode 5 and an electric field formed by the signal electrode 4 and the ground electrode 54 are applied intensively to the ridge portion 20, which also contributes to reducing driving transmission of the optical control device.

In FIG. 3B, two optical waveguides 2 are formed by using the ridge type waveguides 20. The signal electrodes 4 and 41 are disposed corresponding to the ridge type waveguides and, for example, signals in the opposite directions are applied to the signal electrodes.

For example, for the left ridge portion 20, the electric field formed by the signal electrode 4 and the ground electrode 5, the electric field formed by the signal electrode 4 and the ground electrode 54, and the electric field formed by the signal electrode 4 and the signal electrode 41 are applied intensively.

In FIG. 3C, the ridge type waveguides 20 are formed as the two optical waveguides 2 and a ridge portion corresponding to the ground electrode 51 is formed between two optical waveguides. The signal electrodes 4 and 41 are disposed corresponding to the ridge type waveguide 20 and, for example, separate signals are applied to the signal electrodes.

For example, for the left ridge portion 20, the electric field formed by the signal electrode 4 and the ground electrode 5, the electric field formed by the signal electrode 4 and the ground electrode 54, and the electric field formed by the signal electrode 4 and the signal electrode 51 are applied intensively.

Even though forming the depth of a ridge up to the almost same level as the thickness of a substrate leaves a problem in the mechanical strength as a modulator in a current manufacturing technology, confinement of the optical waveguide becomes strong and an electric field formed by a signal electrode is thus applied intensively. In order to increase the mechanical strength, a ridge processing section may be embedded by a low dielectric constant film.

In addition, the substrate 1 below the ground electrode does not need to have an electro-optical effect, and the low dielectric constant film shown in FIG. 4 or 5 may be used instead of the substrate. Accordingly, since there is no need of leaving an electro-optical substrate of a ground electrode portion, a production condition extends. In addition, since a low dielectric constant layer comes to the signal electrode periphery, electrode damage is reduced. This makes it possible to meet a high frequency.

(Optical Control Device Having a Low Dielectric Constant Film)

FIG. 4 illustrates an application related to the optical control device of the present invention, which is an example where a groove that forms a ridge type waveguide or a low dielectric constant film between the signal electrode 4 and the ground electrode 5, which form the first electrode, are disposed. By such arrangement of the low dielectric constant film, adjustment of the impedance or the microwave refractive index in a control electrode becomes possible and it becomes possible to increase a degree of freedom in wiring of control electrodes.

For example, benzocyclobutene (BCB) may be used as a material of the low dielectric constant film, a coating method may be used as a method of manufacturing the low dielectric constant film.

As shown in FIG. 4A, a low dielectric constant film 8 may be formed in grooves formed at both sides of the ridge type waveguide 20, between the signal electrode 4 and the ground electrode 5, or to cover the first electrode.

In addition, as shown in FIG. 4B, a power feed portion 42 of the signal electrode 4 is disposed to go over the ground electrode 5 and the low dielectric constant film 8 is disposed between the ground electrode 4 and the power feed portion 42. Since this allows three-dimensional wiring of control electrodes, the degree of freedom in wiring design related to the control electrode increases. In addition, the ground electrode may also be made to pass through an upper side (position becoming distant from the thin plate) of the signal electrode.

(Optical Control Device Having an Optical Waveguide Formed at a Bottom Surface Side of a Thin Plate)

FIG. 5 illustrates an application related to the optical control device of the present invention, which is an example where the optical waveguide 2 (ridge type waveguide 20) is formed in a bottom surface (lower side in the drawing) of the thin plate 1.

In the case where a thin plate having a thickness of 10 µm or less is used, it is possible to apply an electric field to the ridge portion 20 particularly by an electric field formed by the signal electrode 4 and the ground electrode 54 even if the optical waveguide 2 is formed in the bottom surface of the thin plate 1, the signal electrode 4 and the ground electrode 5 which are the first electrodes are formed on a top surface of the thin plate 1, and the ground electrode 54 which is the second electrode is formed on the bottom surface of the thin plate 1 as shown in FIG. 5A.

In addition, FIG. 5B is an example in which two signal electrodes 4 and 41 are used. An electric field particularly formed by the signal electrode 4 and the ground electrode 54 is applied to the left ridge portion 20 and an electric field particularly formed by the signal electrode 41 and the ground electrode 54 is applied to the right ridge portion 20.

In addition, a low dielectric constant film 81 is formed, as needed, in a groove which forms each ridge portion 20. It is also possible to dispose an air layer and to form a region where a dielectric constant is low instead of the low dielectric constant film 81 in FIG. 5.

In the case of the optical control device shown in FIG. 3, it is necessary to precisely dispose the signal electrode 4 or 41 on the top of the ridge portion of the ridge type waveguide. In the case of the optical control device shown in FIG. 5, however, there is an advantage that the electric field can be efficiently applied to a ridge portion only by setting the width of the signal electrode 4 or 41 equal to or larger than the width of the ridge type waveguide, even if slight positional deviation between both of them occurs.

(Optical Control Device Using a Transparent Electrode)

FIG. 6 illustrates an application related to the optical control device of the present invention, which is an example where transparent electrodes (9 and 91 to 96) are used as electrodes. By using either a transparent electrode or an electrode obtained by disposing a transparent electrode at a thin plate side for the signal electrode or the ground electrode, it is possible to dispose a control electrode to be closer to the optical waveguide while suppressing the propagation loss of a light wave propagating through the optical waveguide even in the case where there is no buffer layer. As a result, a driving voltage can be reduced.

FIG. 6A is an example in which the transparent electrode 9 is used as a ground electrode of the second electrode, and FIG. 6B is an example in which the transparent electrodes 91 and 92 are used as the first electrode. In these cases, the buffer layer 31 or 3 shown in FIG. 3A is not necessary and it becomes possible to dispose electrodes so as to be adjacent to the optical waveguide.

In addition, since the optical waveguide does not exist in the neighborhood of the ground electrode (transparent electrode 91) which forms the first electrode shown in FIG. 6B, the ground electrode (transparent electrode 91) may be formed by using a normal metal electrode.

FIGS. 6C and 6D illustrate an example in which a transparent electrode is used in a part of the control electrode (side being in contact with the thin plate 1 or 11). Since the transparent electrode generally has a high electrical resistivity as compared with a metal electrode, such as Au, metal electrodes 140, 150, and 151 can be disposed so as to come in contact with the transparent electrodes 9 or 93 to 96 in order to lower the electric resistance of the electrodes. The thickness of the transparent electrode is preferably about 0.7 µm, for example, corresponding to that of the buffer layer or may be about 3 µm, which is larger than the above thickness, according to a refractive index.

In addition, as indicated by 93, 95, and 96, the transparent electrodes may be disposed near the ridge type waveguide or on the side of the ridge type optical waveguide and it becomes possible to make an electric field act on the waveguide very effectively.

In addition, FIG. 6C is an example in which the Z-cut type LN substrate is used, and FIG. 6D is an example in which the X-cut type LN substrate is used.

(Optical Control Device Using a Pattern-Like Electrode as the Second Electrode)

FIG. 7 illustrates an application related to the optical control device of the present invention, which is an example where a ground electrode that forms the second electrode is configured by using a pattern-like electrode. By forming the second electrode using the pattern-like electrode with the shape corresponding to the shape of the optical waveguide, the electric field applied to the optical waveguide can be adjusted to the more suitable shape. Accordingly, it becomes possible to further reduce a driving voltage.

In FIG. 7A, a strip-shaped electrode along the optical waveguide 2 is formed as a ground electrode 57 and an electric field formed by the signal electrode 4 and the ground electrode 57 is configured to more concentrate on the optical waveguide 2.

In addition, FIG. 7B is an example in which an X-cut type thin plate 11 is used, and ground electrodes 58 and 59 which form the second electrode are formed by using pattern-like electrodes.

(Optical Control Device Using Polarization Inversion)

FIG. 8 illustrates an application related to the optical control device of the present invention, which is an example where the thin plate 1 is polarization inverted. By inverting the spontaneous polarization of the thin plate 1 including at least a part of the optical waveguide, differential driving of the optical control device can be easily realized by a simple control electrode or driving circuit and accordingly, a reduction in a driving voltage becomes also possible.

In FIG. 8A, spontaneous polarization is arranged in different directions (arrows in the drawing) in substrate regions 12 and 13 of the thin plate 1. A signal electrode 43 which forms the first electrode can apply a common electric field to the optical waveguide 2 formed in each of the substrate regions 12 and 13. Since the polarization directions of the substrate are different in the respective optical waveguides, the phase changes in light waves propagating through the optical waveguides are in opposite states. As a result, the same effect as differential driving can be obtained.

FIG. 8B illustrates an example in which the polarization directions of the substrate regions 12 and 13 of the thin plate 1 are adjusted to be different from each other and a ridge type optical waveguide is used. The signal electrodes 44 which apply an electric field to the two ridge type waveguides 20 are common, and the two signal electrodes 44 are electrically conducted to each other through a connection line 45. In addition, the low dielectric constant film 8 is formed in the groove which forms a ridge type waveguide and between the signal electrode and the ground electrode 5.

(Optical Control Device Using a Through Hole)

Figure 9:
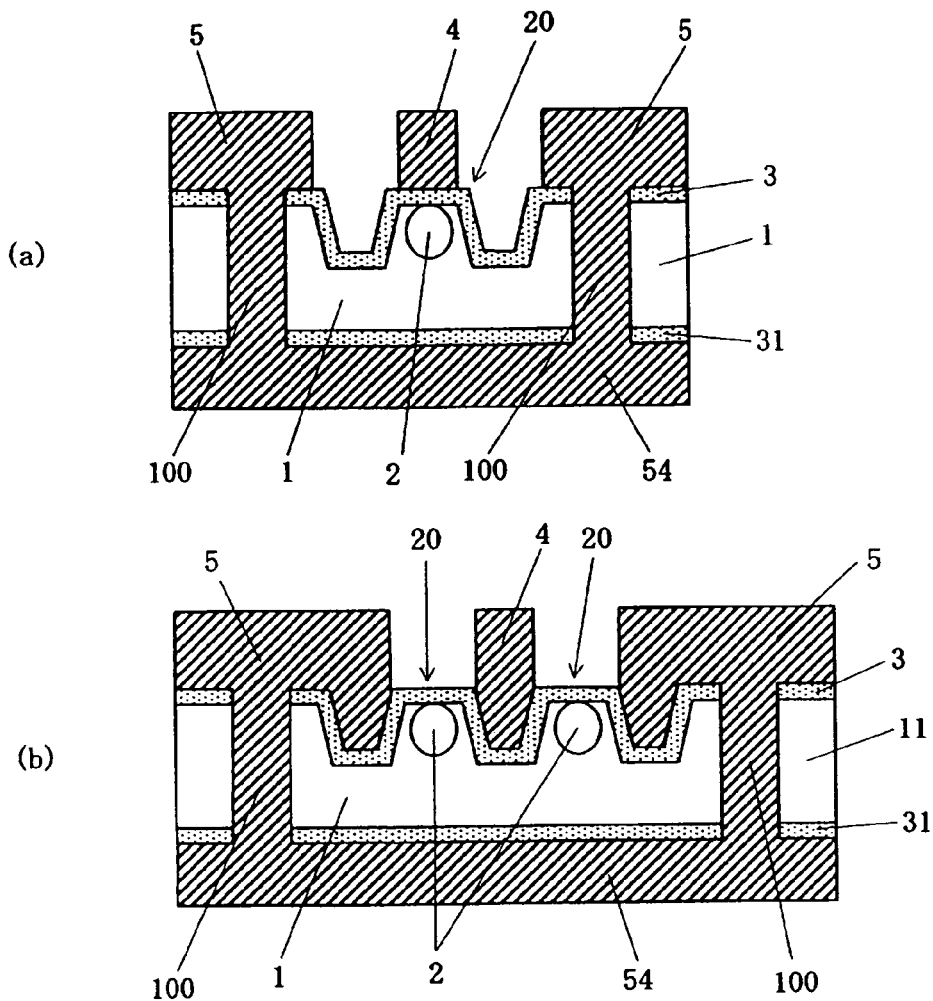
FIG. 9 is a view illustrating an example of an optical control device using a through hole.

FIG. 9 is an application related to the optical control device of the present invention and is an example in which a through hole is used for electrical connection between the ground electrode of the first electrode and the ground electrode of the second electrode. By electrically connecting the ground electrode of the first electrode with the ground electrode of the second electrode through a through hole provided in the thin plate, it is possible to simplify electric wiring lines related to the optical control device and to suppress deviation of floating charges generated in the ground electrode of the first electrode and the ground electrode of the second electrode. As a result, a more suitable electric field can be applied to the optical waveguide.

FIG. 9A is an example using the Z-cut type LN thin plate 1, in which the ground electrode 5 of the first electrode and the ground electrode 54 of the second electrode are maintained in an electrically conductive state by a connection line 100 disposed in the through hole of the thin plate 1.

Although the ground electrode of the first electrode and the ground electrode of the second electrode illustrated in FIGS. 2 to 8 are electrically conducted to each other in the periphery or outside of the thin plate, a timing difference easily occurs in floating charges induced in the ground electrode as a modulated signal applied to a control electrode has a high frequency. For this reason, as shown in FIG. 9A, it becomes possible to suppress the timing difference by making both the ground electrode of the first electrode and the ground electrode of the second electrode electrically conducted to each other in a place near the optical waveguide.

FIG. 9B illustrates that a through hole is similarly provided in an example in which the X-cut type LN thin plate 11 is used.

EMBODIMENTS

In order to see the basic characteristics of the optical control device of the present invention, a change in a driving voltage value (V·cm) in a substrate thickness range of 2 to 10 μm was calculated in an embodiment in which a coplanar electrode is provided on a top surface side of a substrate and a ground electrode is disposed on a bottom surface side as shown in FIG. 3A, a first known technique example in which only a coplanar electrode is disposed on the substrate surface as shown in FIG. 1A, and a second known technique example in which a substrate is interposed between control electrodes on top and bottom surface sides of the substrate as shown in FIG. 1C. In the embodiment, it was assumed that height of the signal electrode 4/thickness of the substrate 1 was 1.25, width of the signal electrode 4/thickness of the substrate 1 was 1.5, gap between the signal electrode 4 and the ground electrode 5/thickness of the substrate 1 was 3, height of the ridge portion 20/thickness of the substrate 1 was 0.8, the thickness of the buffer layers 3 and 31 was 0.5 μm, and the thickness of the ground electrode 54 was 1 μm. In the coplanar electrode of the first known technique, it was assumed that the height and width of the signal electrode 4 were 27 μm and 7 μm, respectively, a gap between a signal electrode and a ground electrode was 25 μm, and the thickness of the buffer layer 3 was 0.7 μm. Moreover, in a type of opposite electrodes of the second known technique, it was assumed that the height and width of the control electrodes 42 and 53 were 27 μm and 42 μm, respectively, and the thickness of the buffer layer (buffer layer is assumed to be formed on both surfaces of the substrate for calculation, even though the buffer layer is formed only on the top surface of the substrate in FIG. 1) was 0.7 μm.

Figure 11:
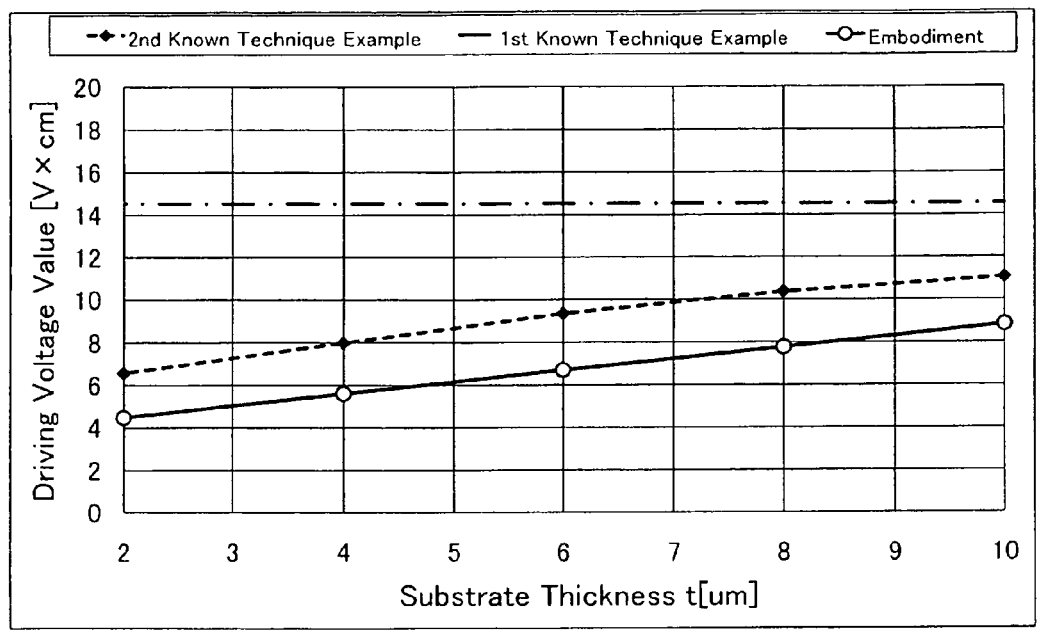
FIG. 11 is a graph illustrating a change of a driving voltage value with respect to the thickness of a substrate.

The calculation results are shown in FIG. 11. From the graph shown in FIG. 11, it is understood that the basic structure of the optical control device of the present invention has an excellent effect since a driving voltage is lower than that in the known optical control devices when the thickness of the substrate is 10 μm or less. A driving voltage value (half-wave voltage Vpai) is preferably 10 V·cm and more preferably, 8 V·cm or less. In FIG. 11, when the thickness of the substrate is 10 μm, the driving voltage value is larger than 8 V·cm. However, it is confirmed that the driving voltage value can be made equal to or smaller than 8 V·cm by readjusting a numeric value set in the embodiment, even in the case when the thickness of the substrate is 10 μm.

Therefore, it is easily understood that the thickness of the substrate is preferably 10 μm or less in the optical control device of the invention.

Next, a result of calculation of various kinds of parameters that determine the structure of the optical control device of the present invention will be described.

Figure 10:
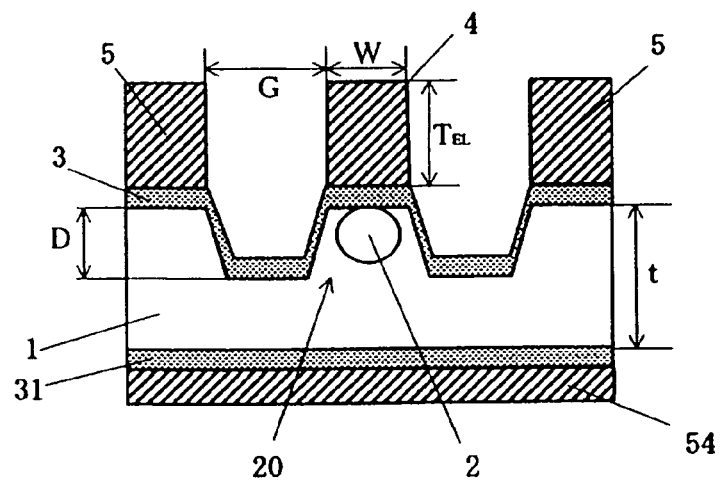
FIG. 10 is a view explaining a computation model.

As an example of the configuration of the optical control device of the present invention, in the case where the control electrodes are configured to include the first electrode and the second electrode disposed to interpose the thin plate therebetween, the first electrode has a coplanar type electrode structure including at least a signal electrode and a ground electrode, and the second electrode has at least a ground electrode and is configured to apply the electric field to the optical waveguide in cooperation with the signal electrode of the first electrode as shown in FIG. 10, it was confirmed by using a finite element method that an optical control device satisfying the following conditions can be designed by adjusting at least the width W and height $T_{EL}$ of the signal electrode, a gap G between the signal electrode and the ground electrode, and the depth D of a ridge when the optical control device is a ridge type optical waveguide. In addition, as the optical waveguide, a straight waveguide or a Mach-Zehnder type interference system in which a straight waveguide is combined may also be configured.

(Conditions of a Signal Line)

(1) A half-wave voltage Vpai in a signal line is 8 V·cm or less (2) Impedance Z is 30Ω or more and 60Ω or less (3) A product of a refractive index difference Δn between light and a microwave and a length (operation length) L of an operating portion in which an electric field of a signal line acts on the optical waveguide is 1.3 cm or less Moreover, in the case of Δn×L≤1.3 cm, it is possible to set a light range of the optical control device to 10 GHz or more.

As a model of calculation, for light having a wavelength of 1.55 μm, a ridge type optical waveguide in which a sectional view of one side, where the electric field of the signal line acts on the optical waveguide, configures a Mach-Zehnder type interference system shown in FIG. 10 is assumed. A Z-cut type LN is used for the substrate 1, $SiO_2$ with the thickness of 0.5 μm is used for the buffer layers 3 and 31, and gold is used for the signal electrode 4 and the ground electrode 5. At this time, the width of the signal electrode 4, a gap between the signal electrode 4 and the ground electrode 5, the height of the signal electrode 4 or the ground electrode 5, the depth of a ridge of the ridge type optical waveguide 20, and the thickness of the thin plate 1 were set to W, G, $T_{EL}$, D, and t, respectively.

For four cases in which the thickness t of the substrate is 2 μm, 4 μm, 6 μm, and 8 μm, simulation was performed, and numeric values which become conditions discretely in the following ranges were set for each parameter. (Width W Of a signal electrode)

The width W of the signal electrode was set such that W/t became 0.2, 0.5, 0.8, 1.1, 1.4, 1.7, and 2.0 by using a standard value as the thickness t of the substrate.

(Depth D of a Ridge)

The depth D of the ridge was set such that D/t became 0.2, 0.4, 0.6, and 0.8 by using a standard value as the thickness t of the substrate.

(Height $T_{EL}$ of an Electrode)

The height $T_{EL}$ of an electrode was set to 0.5, 1.0, 1.5, 2.0, 2.5, and 3.0 (μm).

(Gap G Between Electrodes)

The gap G between electrodes was set such that G/t (expressed as 'Gap/t' in the following drawings) became 1.0, 2.25, 3.5, 4.75, and 6.0 by using a standard value as the thickness t of the substrate.

From the numeric value set as each parameter, the half-wave voltage Vpai (expressed as 'Vpi' in the following drawings), the impedance Z (expressed as 'Z0' in the following drawings), a microwave refractive index NM were calculated, and then 'O' was given for a result that satisfies the following conditions and 'X' was given for a result that does not satisfy the conditions.

(Evaluation Conditions)

(1) Vpai≤8 (V·cm)

(2) 30Ω≤Z≤60Ω

(3) 1.5 ≤ NM ≤ 2.8

Here, for a range of the microwave refractive index NM, a condition satisfying the condition (Δn×L is 1.3 or less) of a signal line in the case where the operation length L is 2 cm≤L≤6 cm was set to the evaluation condition.

Results of evaluation performed on the basis of the above-mentioned evaluation conditions are shown in FIGS. 12 to 27.

Figure 13:
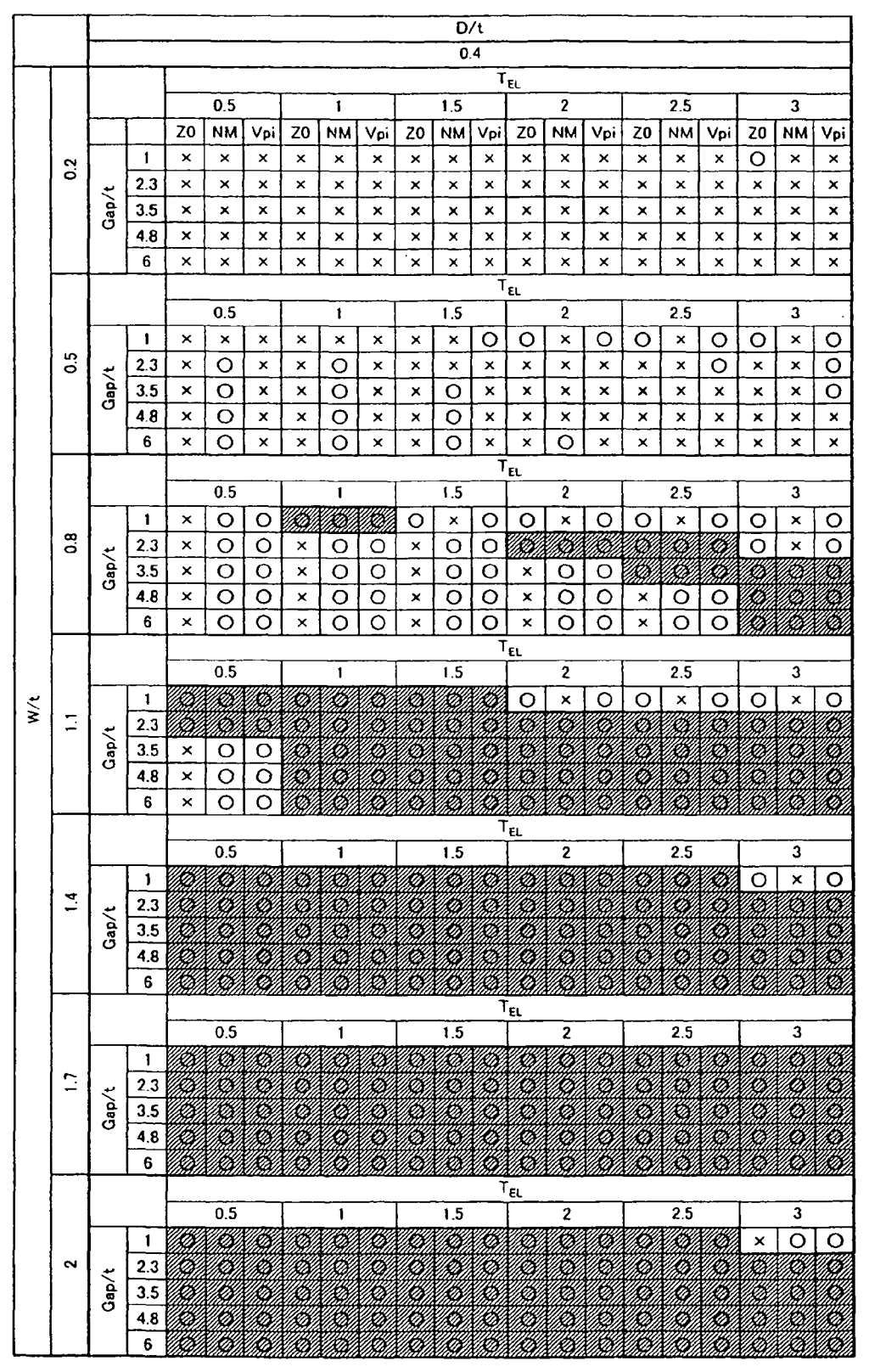

A result in the case of t=2 μm is shown in FIG. 12 (D/t is 0.2), FIG. 13 (D/t is 0.4), FIG. 14 (D/t is 0.6), and FIG. 15 (D/t is 0.8).

Figure 17:
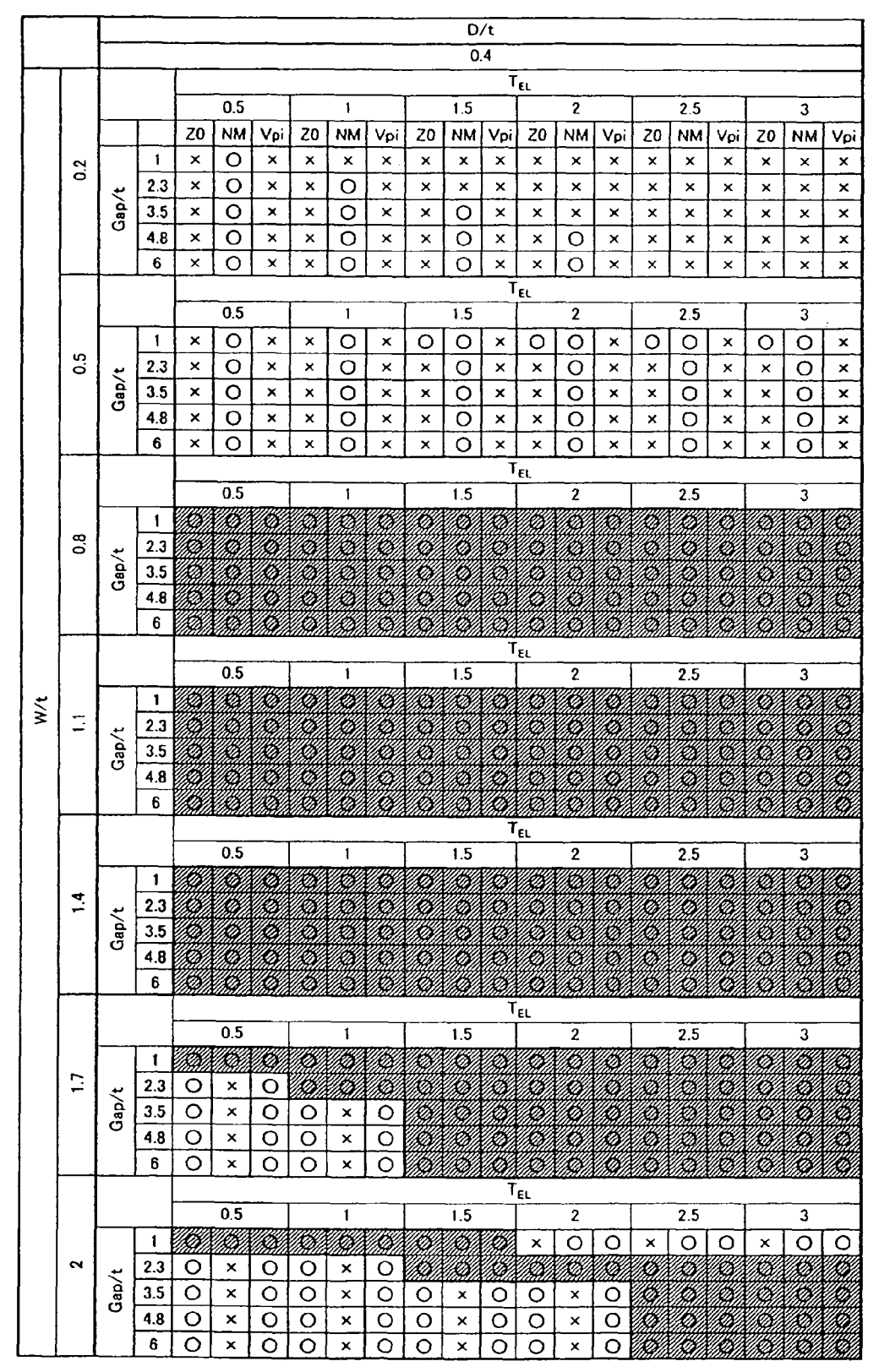

A result in the case of t=4 μm is shown in FIG. 16 (D/t is 0.2), FIG. 17 (D/t is 0.4), FIG. 18 (D/t is 0.6), and FIG. 19 (D/t is 0.8).

A result in the case of t=6 μm is shown in FIG. 20 (D/t is 0.2), FIG. 21 (D/t is 0.4), FIG. 22 (D/t is 0.6), and FIG. 23 (D/t is 0.8).

A result in the case of t=8 μm is shown in FIG. 24 (D/t is 0.2), FIG. 25 (D/t is 0.4), FIG. 26 (D/t is 0.6), and FIG. 27 (D/t is 0.8).

In addition, a portion which satisfies all of the above evaluation conditions (1) to (3) is shaded.

From FIGS. 12 to 27, in the optical control device of the present invention, it is understood that an optical control device satisfying the above conditions can be easily realized by adjusting the width W of a signal electrode, the gap G between a signal electrode and a ground electrode, the height $T_{EL}$ of a signal electrode or a ground electrode, the depth D of a ridge of a ridge type optical waveguide, and the thickness t of a substrate.

In addition, from the results shown in FIGS. 12 to 27, the following things can be understood for each parameter.

(Range of the Signal Electrode Width W)

In any case when the thickness t of the substrate is 2, 4, or 6 μm, a portion that satisfies the above-mentioned evaluation conditions exists in a range of W/t>0.2.

Figure 28:
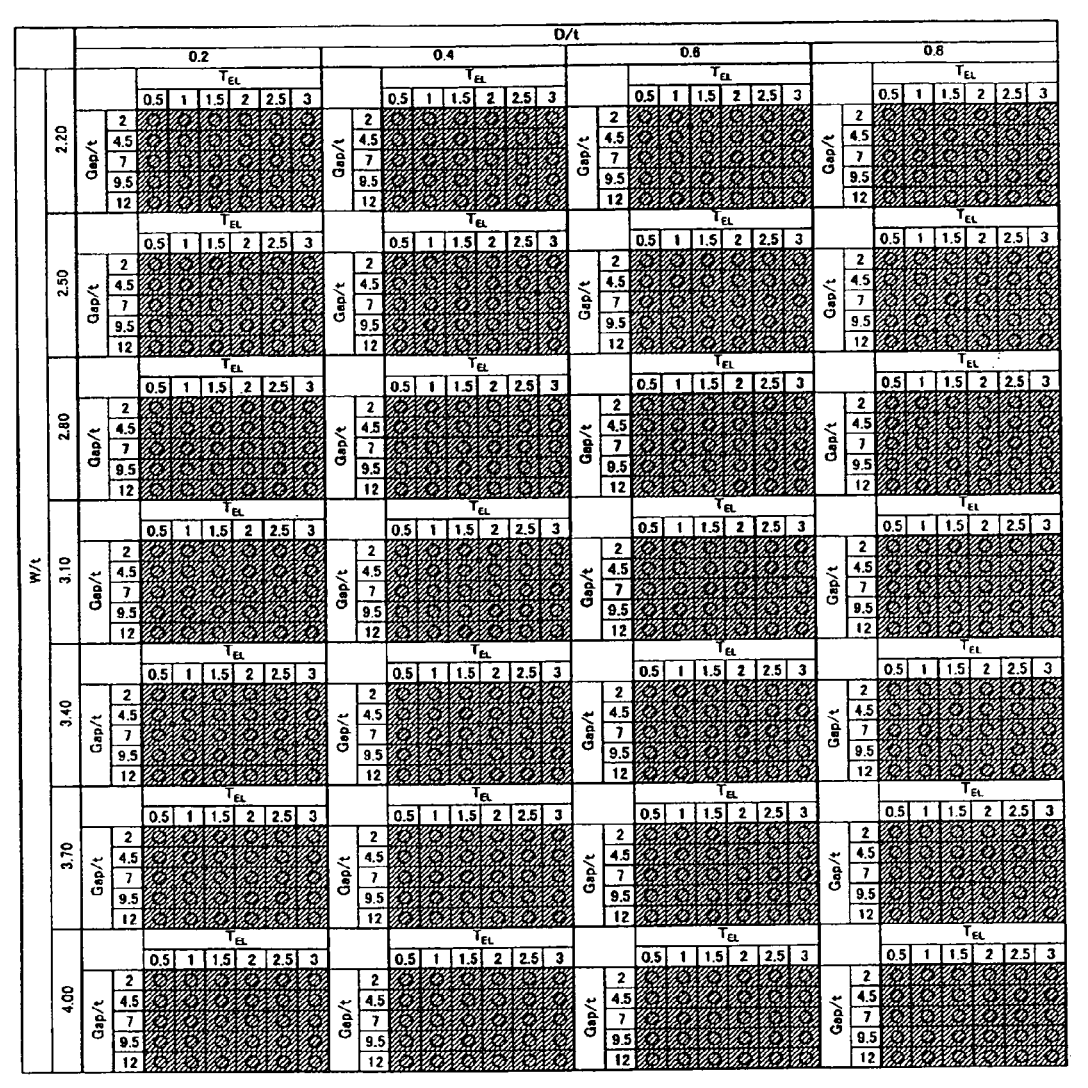
Figure 29:
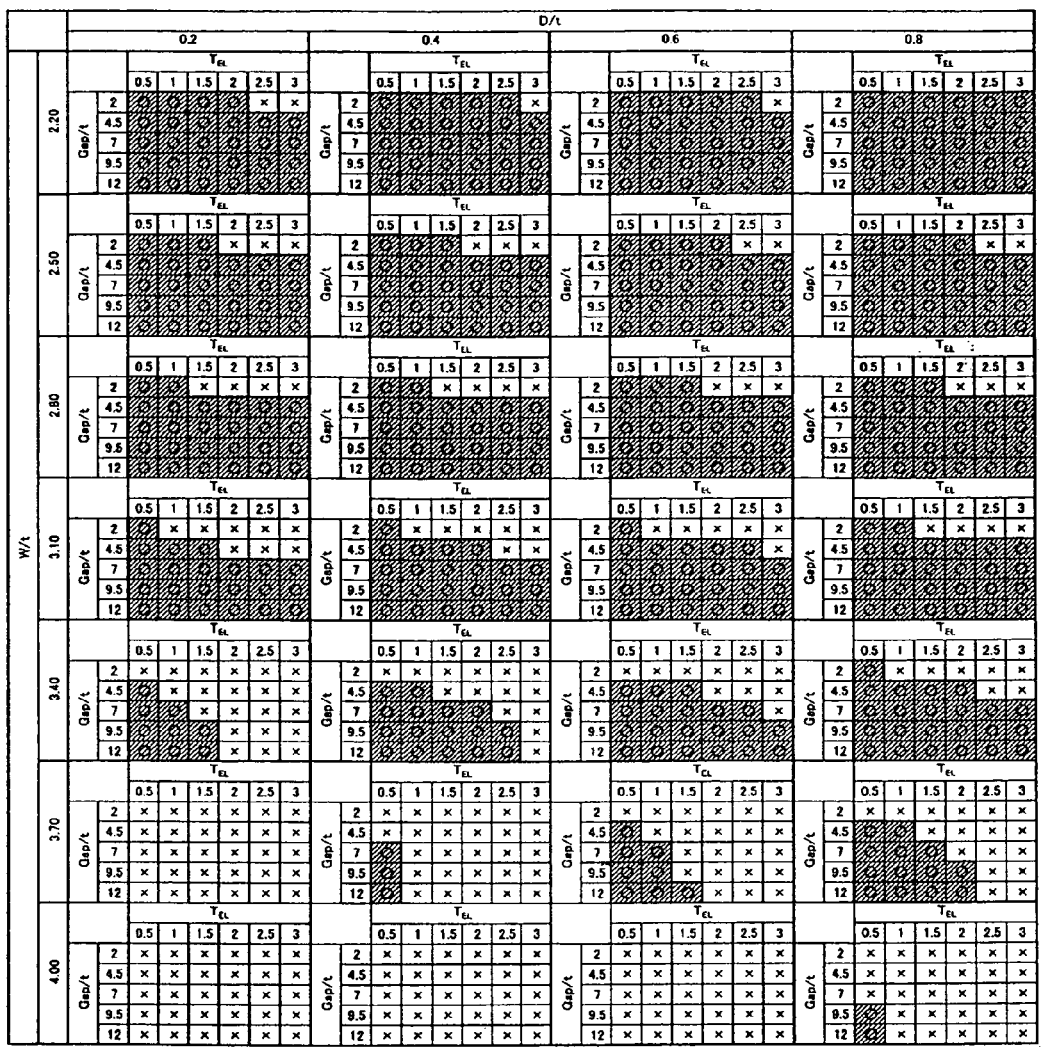
FIG. 29 is a table illustrating Z evaluation in a calculation result (t=2 μm, W/t=2.2-4.0)
Figure 30:
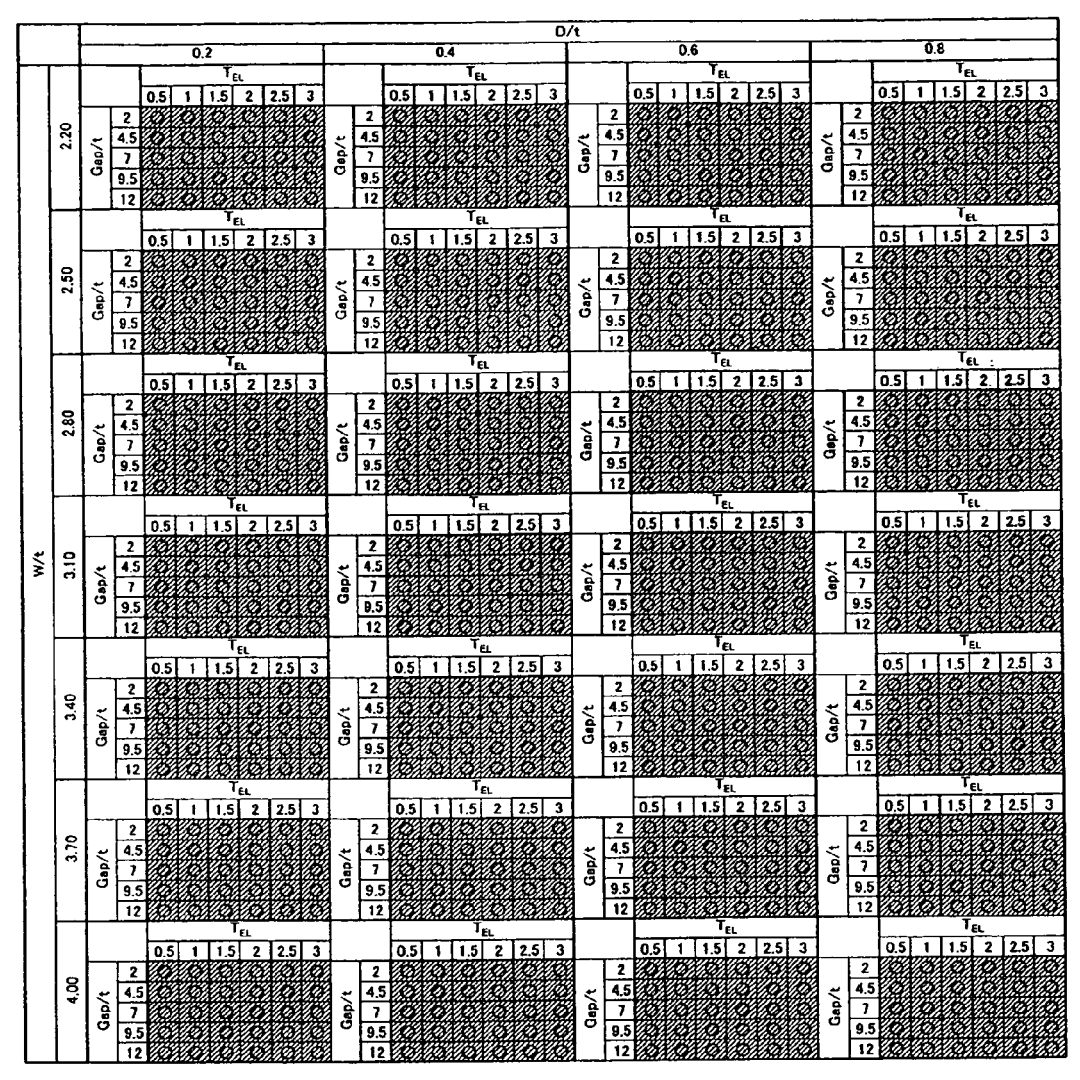

Particularly for t=2 μm, referring to data (refer to FIGS. 28 to 30) obtained by changing W/t from 2.2 to 4.0, an upper limit of W/t is regulated by deviation of Z from the evaluation conditions and a lower limit of W/t is regulated by deviation of Z or Vpai from the evaluation conditions. This is because a capacitance between a signal electrode and a ground electrode increases as W/t increases and accordingly, Z decreases. As a result, the above-mentioned conditions are not satisfied. On the other hand, since the capacitance between the electrodes decreases as W/t decreases, Z increases. As a result, the above-mentioned conditions are not satisfied. In addition, even when W/t is too small, light is not confined in the optical waveguide. Accordingly, the modulation efficiency of the electric field formed by signal electrodes and the optical waveguide decreases and as a result, Vpai does not satisfy the above conditions.

The upper limit of W will be examined in more detail.

From the fact that the upper limit of W/t in the case of t=2 μm is about 4.0 and the upper limit of W/t in the case of t=6 μm is about 1.4, it can be easily understood that the upper limit of W/t is limited to 'W/t=−0.65t+5.3' in the case of the model shown in FIG. 10. That is, in the case where the relationship W/t between the thickness t of the thin plate and the width W of the signal electrode is within a range regulated to be equal to or larger than 0.2 and equal to or smaller than −0.65t+5.3 as an example of the model shown in FIG. 10, it becomes possible to realize conditions where the half-wave voltage Vpai related to the signal line is 8 V·cm or less, the impedance Z is 30Ω or more and 60Ω or less, and a product of the refractive index difference Δn between light and a microwave and the length L of an operating portion in which the electric field of the signal electrode acts on the optical waveguide is 1.3 cm or less while increasing the setting degree of freedom of each parameter of the height $T_{EL}$ of the signal electrode of the first electrode, the gap G between the signal electrode and the ground electrode in the first electrode, and the depth D of a ridge when the optical control device is a ridge type optical waveguide.

(Range of the Depth D of a Ridge)

Referring to data (refer to FIGS. 16 to 19) in the case of t=4 μm, for the lower limit of D, limited conditions are different near the upper limit or lower limit of W/t.

Since the confinement efficiency of a light wave is lowered if D and W are made small, the modulation efficiency by the electric field formed by the control electrodes is lowered. Accordingly, since Vpai becomes higher than the above evaluation conditions near the boundary of the lower limit of W, the lower limit of D is regulated. Since the capacitance between the signal electrode and the ground electrode increases, Z decreases, and NM increases near the boundary of the upper limit of W/t, Z or NM is regulated by deviation from the above evaluation conditions.

In addition, referring to data in the case of W/t=0.8 at t=4 μm, the capacitance between the electrodes decreases and Z increases as D/t increases. Accordingly, since Z tends to deviate from the above evaluation conditions, the upper limit of D may be regulated by the change in Z.

(Range of the Gap G Between Electrodes)

Referring to data (refer to FIG. 13) in the case of t=2 μm, D/t=0.4, W/t=0.8, and $T_{EL}$=2 to 3 μm, the lower limit of G is regulated by deviation of NM from the above evaluation conditions. In addition, referring to data in the case of W/t=0.8 and 1.1, the upper limit of G is regulated by deviation of Z from the above evaluation conditions. Since the gap between electrodes is small near the lower limit of G, NM is small, deviating from the above evaluation conditions. On the contrary, Z increases near the upper limit of G, deviating from the above evaluation conditions.

(Range of the Electrode Height $T_{EL}$)

Referring to data (refer to FIGS. 17 to 19) in the case of t=4 μm, W/t=2, and D/t=0.4, 0.6, and 0.8, the upper limit and lower limit of $T_{EL}$ are regulated by deviation of Z or NM from the above evaluation conditions. The upper limit of $T_{EL}$ is because Z decreases and NM decreases as $T_{EL}$ increases, deviating from the above evaluation conditions of Z or NM.

The lower limit of $T_{EL}$ is because Z increases and NM increases as $T_{EL}$ decreases, deviating from the above evaluation conditions of Z or NM.

INDUSTRIAL APPLICABILITY

According to the optical control device related to the present invention, it becomes possible to provide an optical control device capable of realizing speed matching between a microwave and a light wave or impedance matching of microwaves and of reducing a driving voltage.

Furthermore, it is possible to provide an optical control device which can operate stably since an increase in temperature of the optical control device can be suppressed by reduction in a driving voltage, and it becomes possible to provide an optical control device allowing a cheaper low driving voltage type driving device to be used.

The invention claimed is:

1. An optical waveguide device comprising:
a thin plate which has an electro-optical effect and has a thickness of 30 μm or less;
an optical waveguide formed in the thin plate; and
control electrodes that modulate light passing through the optical waveguide by applying an electric field to the optical waveguide,
wherein the optical waveguide is a ridge type optical waveguide,
the control electrodes are configured to include a first electrode and a second electrode disposed to interpose the thin plate in which the optical waveguide is formed therebetween, so that the optical waveguide is positioned between the first electrode and a second electrode and within the thin plate,
the first and second electrodes are disposed on opposite sides of the thin plate in which the optical waveguide is formed,
the first electrode is a coplanar type electrode including at least a signal electrode and a ground electrode, and
the second electrode has at least a ground electrode, and
the second electrode is configured to apply an electric field to modulate light passing through the optical waveguide positioned between the first electrode and the second electrode and within the thin plate in cooperation with the signal electrode of the first electrode.

2. The optical waveguide device according to claim 1, wherein a buffer layer is formed between the thin plate and the first electrode or the second electrode.

3. The optical waveguide device according to claim 1, wherein the signal electrode or the ground electrode is formed by either a transparent electrode or an electrode obtained by disposing a transparent electrode at a thin plate side.

4. The optical waveguide device according to claim 1, wherein at least grooves disposed at both sides of the ridge type waveguide are filled with a low dielectric constant film.

5. The optical waveguide device according to claim 4, wherein a signal line for supplying electric power to the signal electrode is disposed to go over or below the ground electrode of the first electrode, and
the low dielectric constant film is disposed between the signal line and the ground electrode.

6. The optical waveguide device according to claim 1, wherein the second electrode is a pattern-like electrode having a shape corresponding to the shape of the optical waveguide.

7. The optical waveguide device according to claim 1, wherein the ground electrode of the first electrode and the ground electrode of the second electrode are electrically connected to each other through a through hole provided in the thin plate.

8. The optical waveguide device according to claim 1, wherein spontaneous polarization of the thin plate including at least a part of the optical waveguide is inverted.

9. The optical waveguide device according to claim 1, wherein the thin plate is bonded to a supporting substrate through an adhesive layer with the first electrode or the second electrode interposed therebetween.

10. The optical waveguide device according to claim 9, wherein the second electrode is disposed on the supporting substrate.

11. The optical waveguide device according to claim 1, wherein at least width W and height $T_{EL}$ of the signal electrode of the first electrode, a gap G between the signal electrode and the ground electrode in the first electrode, and a depth D of a ridge of the ridge type optical waveguide are set such that a half-wave voltage Vpai related to the signal electrode is 8 V·cm or less, impedance Z is 30Ω or more and 60Ω or less, and a product of a refractive index difference Δn between light and a microwave and a length L of an operating portion in which an electric field of the signal electrode acts on the optical waveguide is 1.3 cm or less.

\* \* \* \* \*